(12) United States Patent
Wakabayashi et al.

(10) Patent No.: US 8,113,756 B2
(45) Date of Patent: Feb. 14, 2012

(54) CLIP

(75) Inventors: Yasuki Wakabayashi, Yokohama (JP);
Hirotatsu Matsuo, Yokohama (JP);
Kiyotaka Itou, Yokohama (JP);
Tetsutaro Nakagawa, Yokohama (JP);
Yusuke Arai, Yokohama (JP); Naoki Aizawa, Yokohama (JP)

(73) Assignees: Piolax Inc., Yokohama-shi (JP); Nissan Motor Co., Ltd., Yokohama-shi (JP)

( * ) Notice: Subject to any disclaimer, the term of this patent is extended or adjusted under 35 U.S.C. 154(b) by 724 days.

(21) Appl. No.: 11/825,076

(22) Filed: Jul. 2, 2007

(65) Prior Publication Data
US 2008/0008560 A1    Jan. 10, 2008

(30) Foreign Application Priority Data

Jul. 5, 2006 (JP) ................................. 2006-185332
Nov. 10, 2006 (JP) ................................. 2006-305969

(51) Int. Cl.
*F16B 19/00* (2006.01)
(52) U.S. Cl. ........................................................ 411/508
(58) Field of Classification Search ................ 411/508, 411/913; 24/297, 453
See application file for complete search history.

(56) References Cited

U.S. PATENT DOCUMENTS

| | | | | |
|---|---|---|---|---|
| 4,133,246 A | * | 1/1979 | Small | 411/15 |
| 4,739,543 A | * | 4/1988 | Harris, Jr. | 24/297 |
| 5,039,267 A | * | 8/1991 | Wollar | 411/508 |
| 5,129,768 A | | 7/1992 | Hoyle et al. | |
| 5,233,870 A | * | 8/1993 | Peroni | 73/323 |
| 5,333,822 A | * | 8/1994 | Benoit et al. | 248/71 |
| 5,551,817 A | * | 9/1996 | Kanie | 411/107 |
| 5,947,631 A | | 9/1999 | Hironaka et al. | |
| 6,203,240 B1 | * | 3/2001 | Hironaka et al. | 403/397 |
| 6,471,313 B1 | | 10/2002 | Ueda et al. | |

(Continued)

FOREIGN PATENT DOCUMENTS

| | | |
|---|---|---|
| CN | 1829024 A | 9/2006 |
| DE | 296 01 784 U1 | 5/1996 |

(Continued)

OTHER PUBLICATIONS

European Search Report dated Oct. 23, 2007 issued in counterpart European Application No. 07012712.1.

(Continued)

*Primary Examiner* — Flemming Seather
(74) *Attorney, Agent, or Firm* — Holtz, Holtz, Goodman & Chick, PC

(57) ABSTRACT

Provided is a clip which can be easily detached from a mounting hole solely by pulling a base portion thereof in any one direction. A clip (10) is equipped with a base portion (20) to engage with a front-side peripheral edge of a mounting hole (5), and a locking leg (30) to engage with a back-side peripheral edge of the mounting hole (5). The locking leg (30) has a stem portion (40) and a pair of elastic engagement members (50) extending in an anchor-fluke-like fashion from the forward ends of the stem portion (40) and having at their forward ends engagement portions (51) to engage with the back-side peripheral edge of the mounting hole (5). An axis (C) of the stem portion (30) and a line (L) connecting the centers of the engagement portions (51) of the pair of elastic engagement members (50) are offset from each other as seen in an axial direction of the stem portion (40). When the base portion (20) is pulled strongly, the stem portion (40) gradually leaves the mounting hole (5) while warped in an arch, with the elastic engagement members (50) and the stem portion (40) opening in a V-shape, thus making it possible to detach the clip (10) from the mounting hole (5) relatively easily.

18 Claims, 27 Drawing Sheets

U.S. PATENT DOCUMENTS

| | | | |
|---|---|---|---|
| 6,575,681 B2 * | 6/2003 | Kojima et al. | 411/508 |
| 7,351,023 B2 * | 4/2008 | Scroggie et al. | 411/508 |
| 7,669,295 B2 * | 3/2010 | Wakabayashi | 24/297 |

FOREIGN PATENT DOCUMENTS

| | | | |
|---|---|---|---|
| JP | 63-68506 U | 5/1988 | |
| JP | 01-19543 Y2 | 6/1989 | |
| JP | 3-81410 U | 8/1991 | |
| JP | 7-41027 U | 7/1995 | |
| JP | 9-217864 A | 8/1997 | |

OTHER PUBLICATIONS

Chinese Office Action dated Oct. 30, 2009 issued in a counterpart Chinese Application No. 2007101287032.

English translation of Chinese Office Action dated Oct. 30, 2009 issued in counterpart Chinese Application No. 20070128703.2.

Japanese Office Action dated Jun. 22, 2010 and English translation thereof, issued in counterpart Japanese Application No. 2006-305969.

* cited by examiner

[Figure 1]
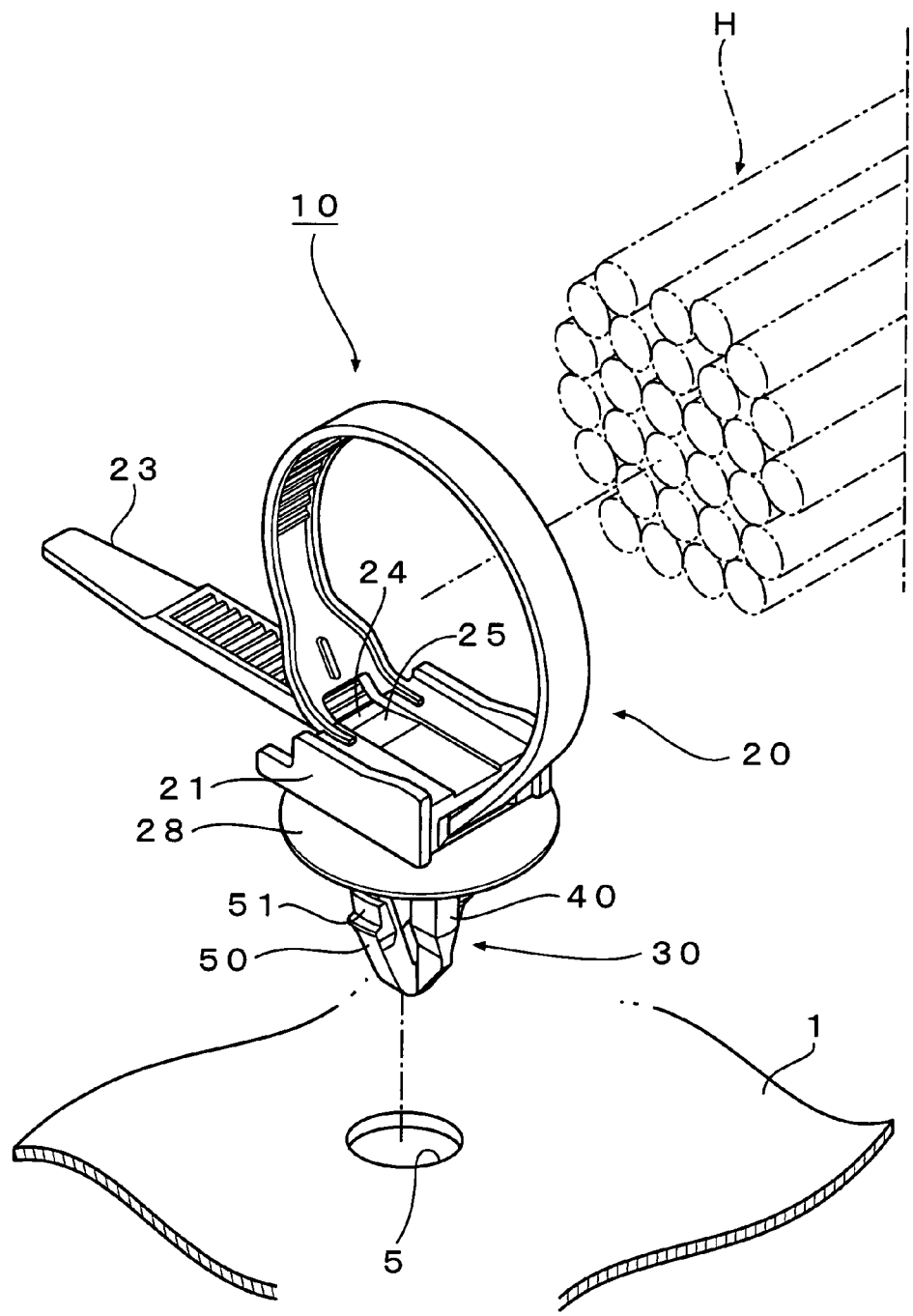

[Figure 2]
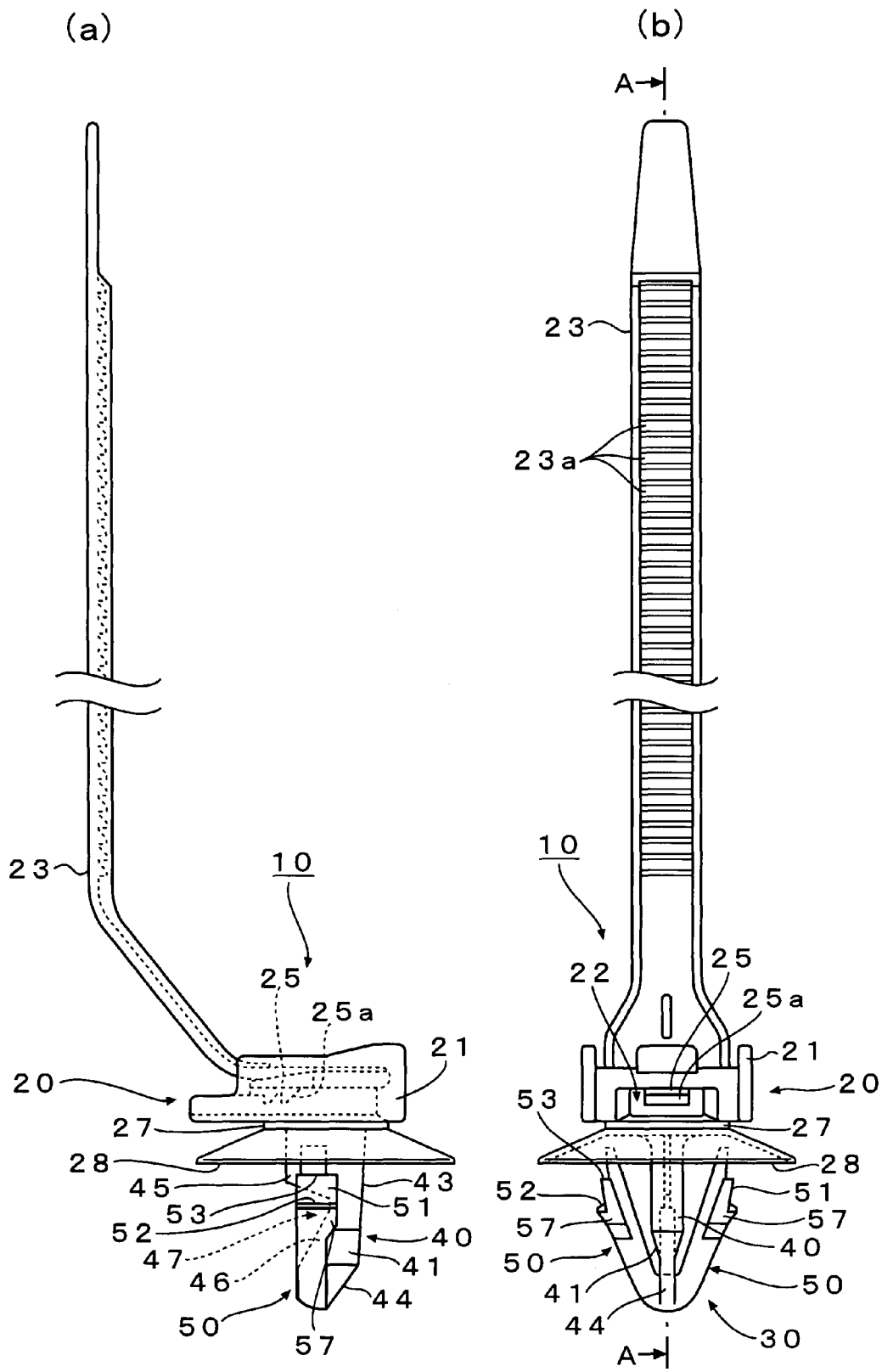

[Figure 3]
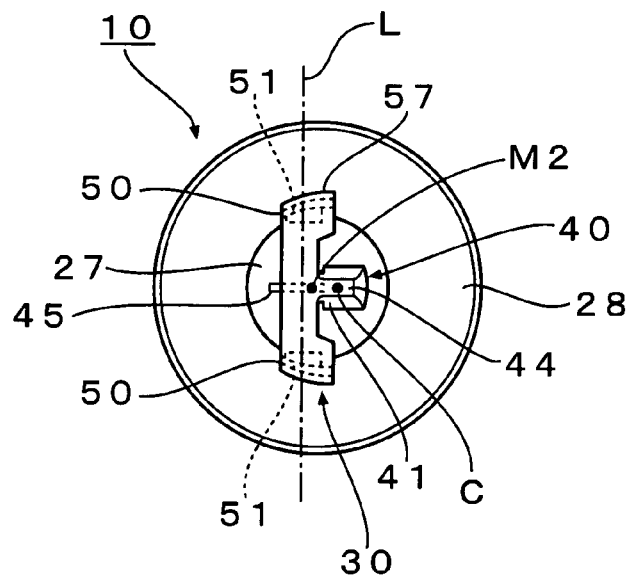
[Figure 4]
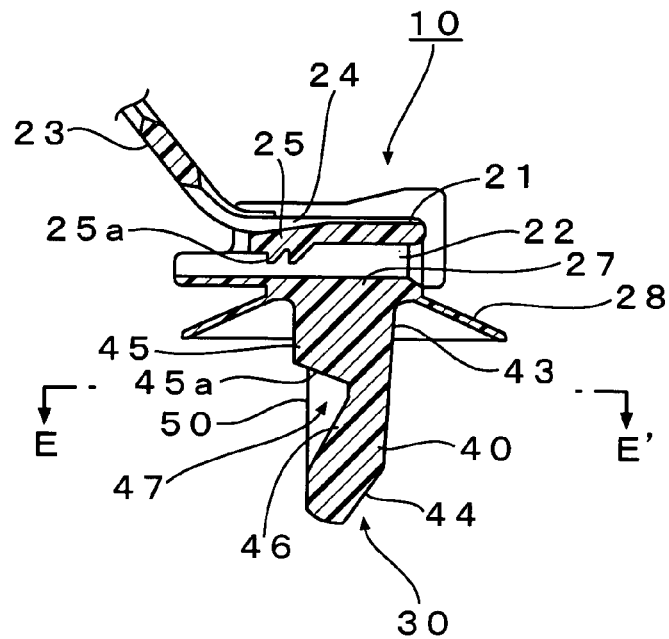

[Figure 5]
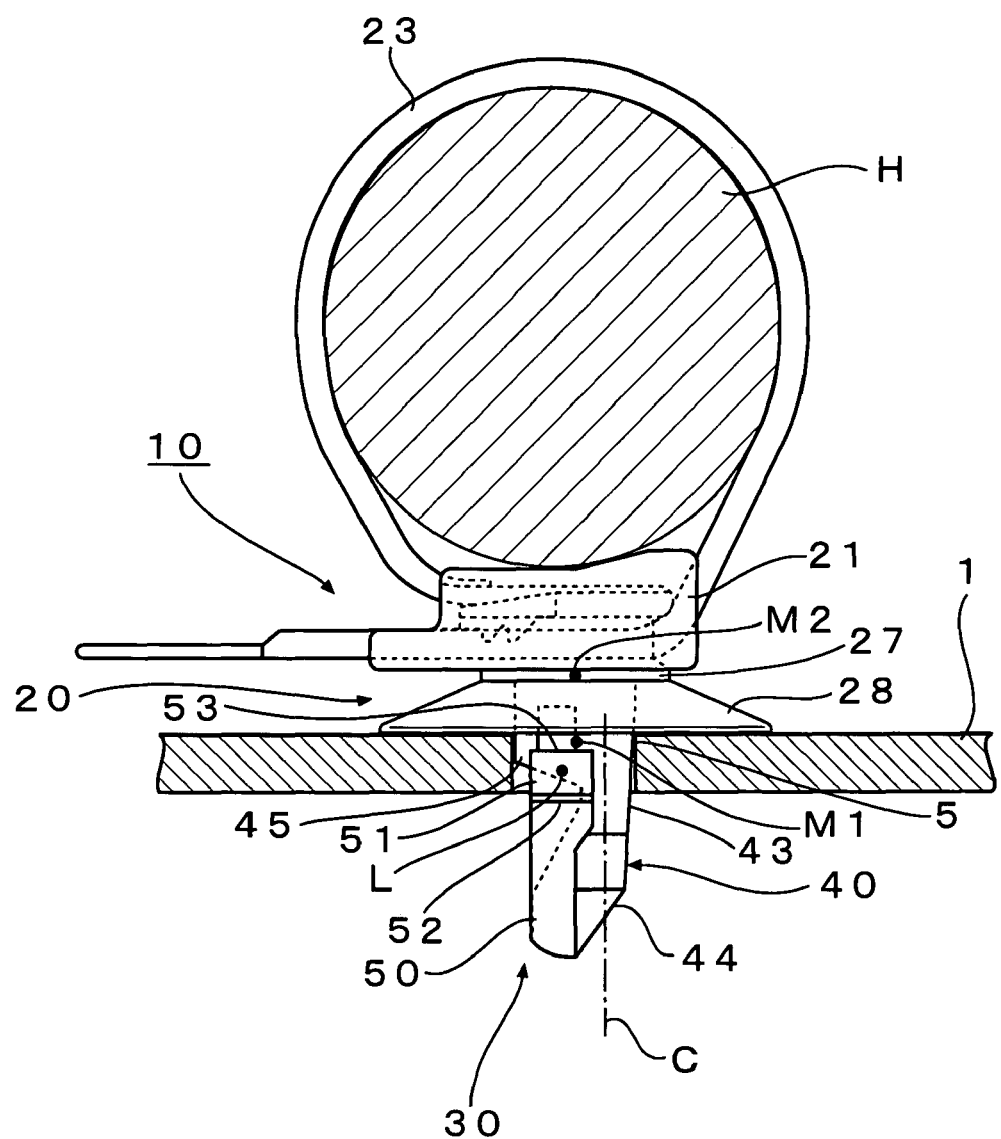

[Figure 6]
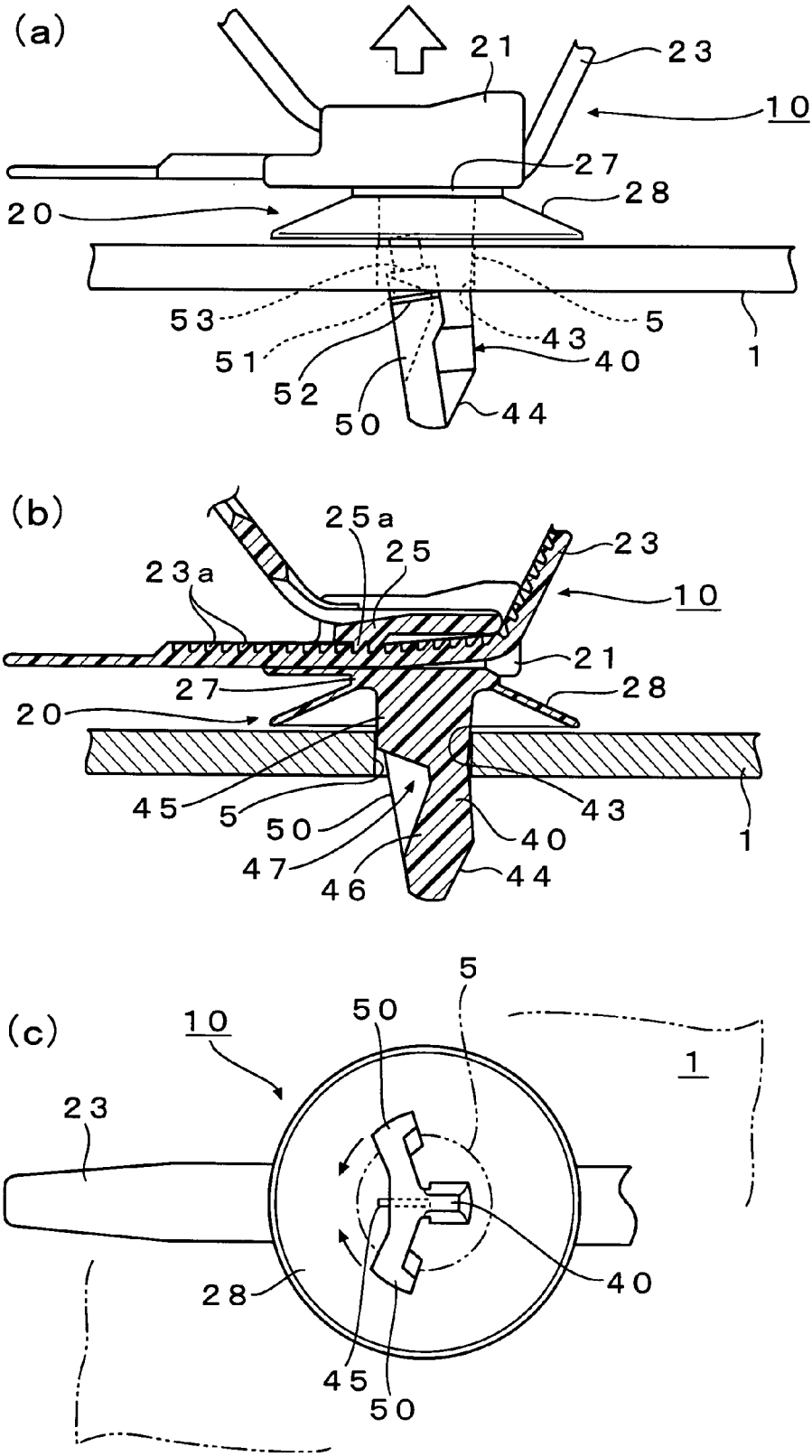

[Figure 7]
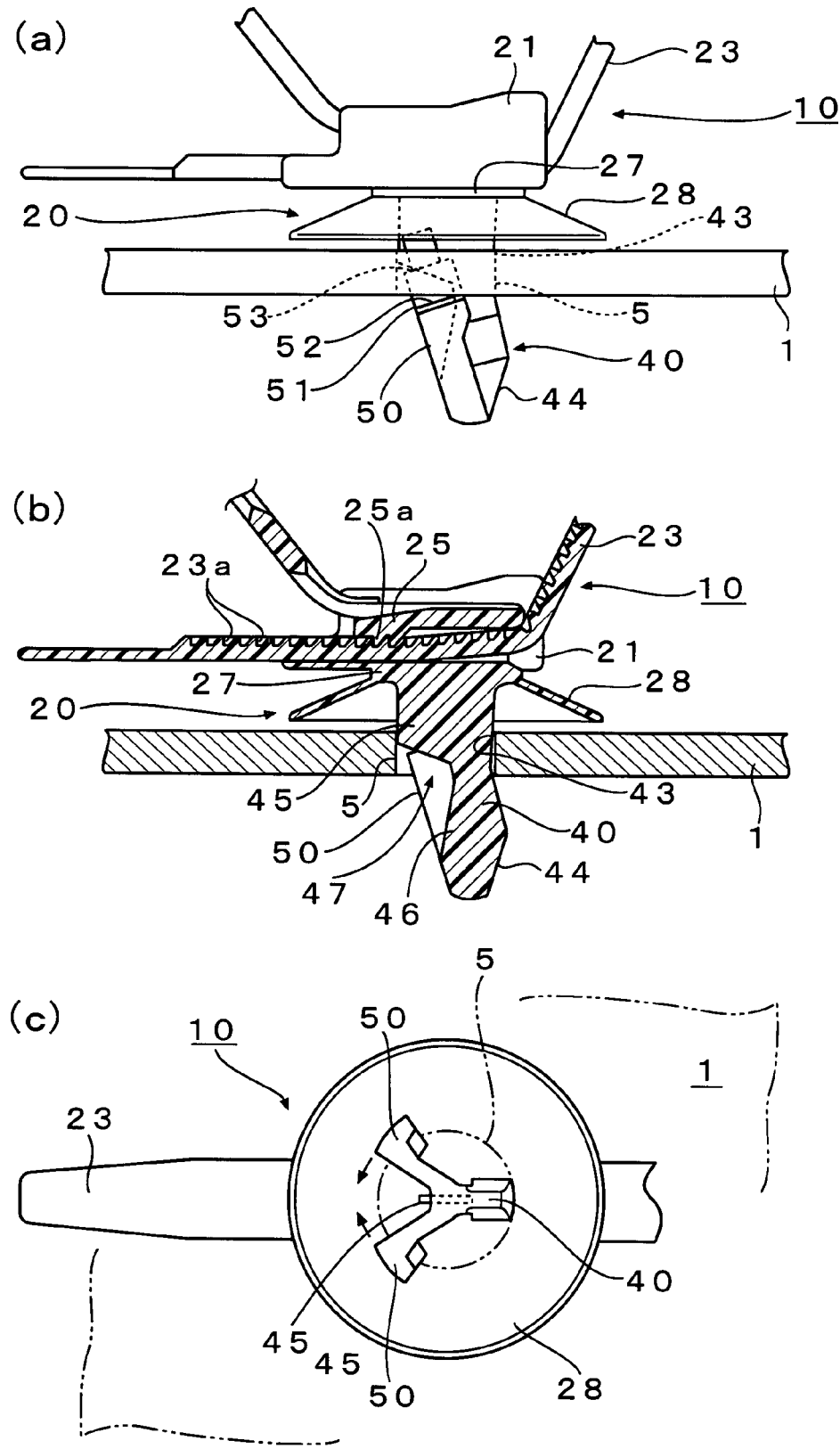

[Figure 8]
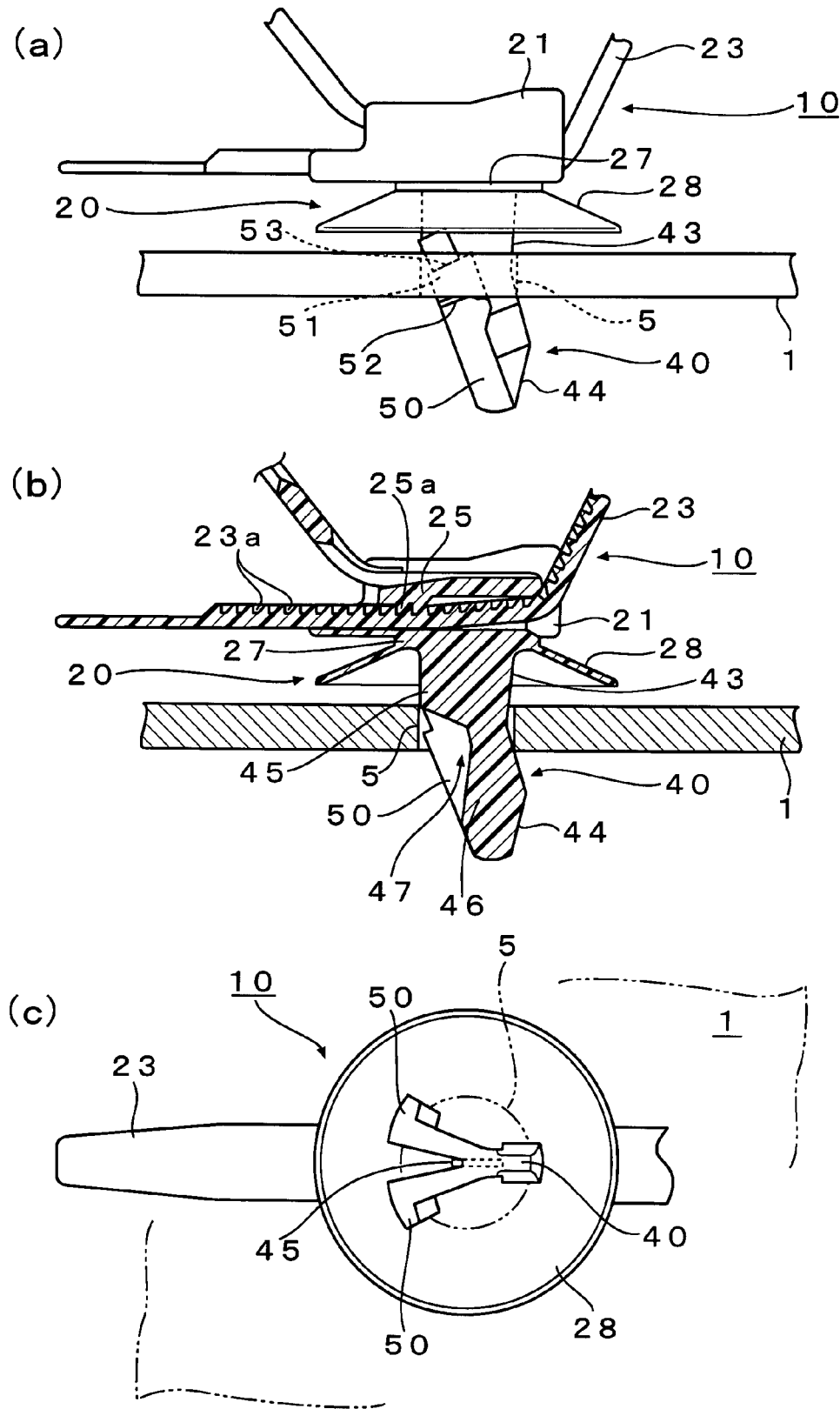

[Figure 9]
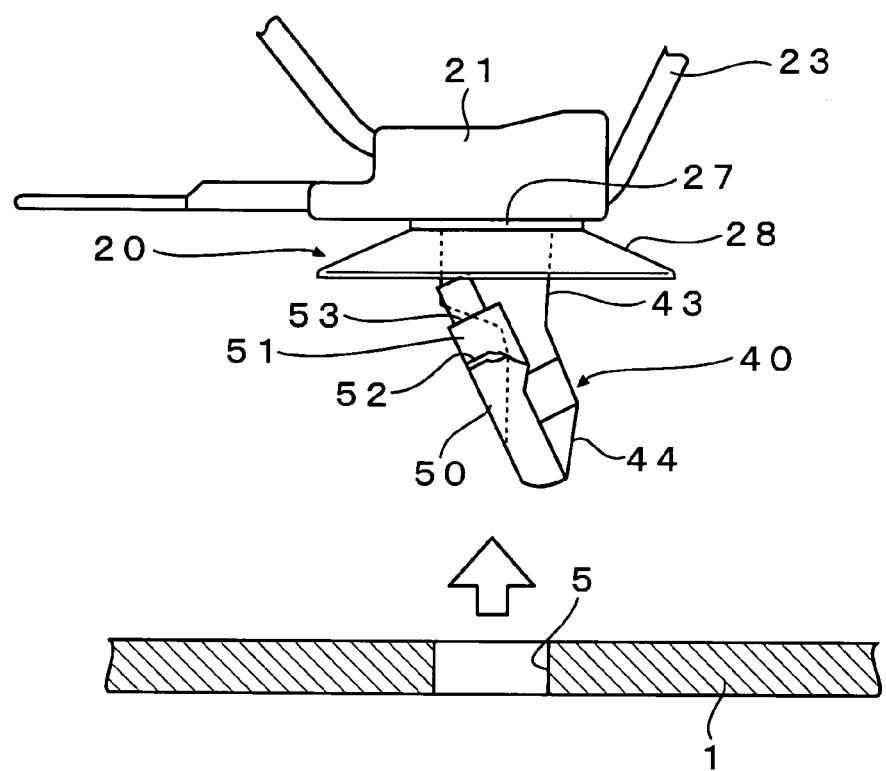

[Figure 10]
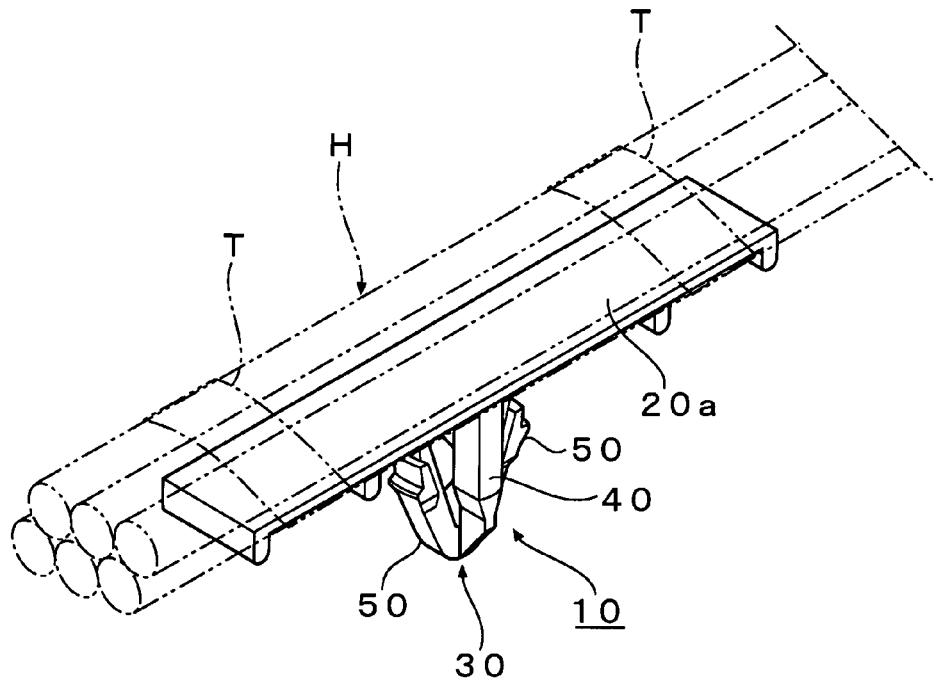
[Figure 11]
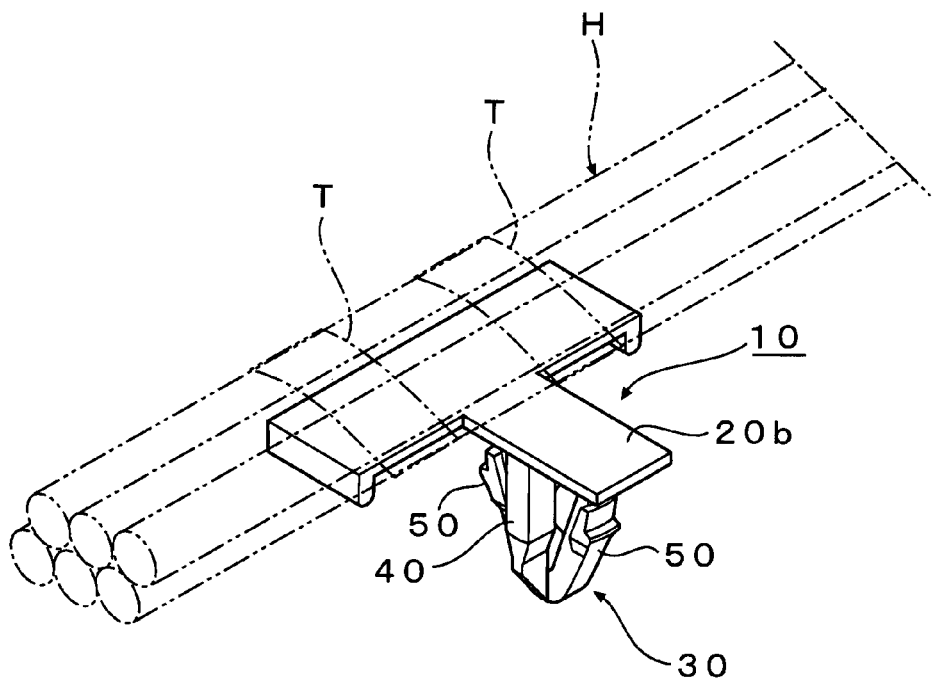

[Figure 12]
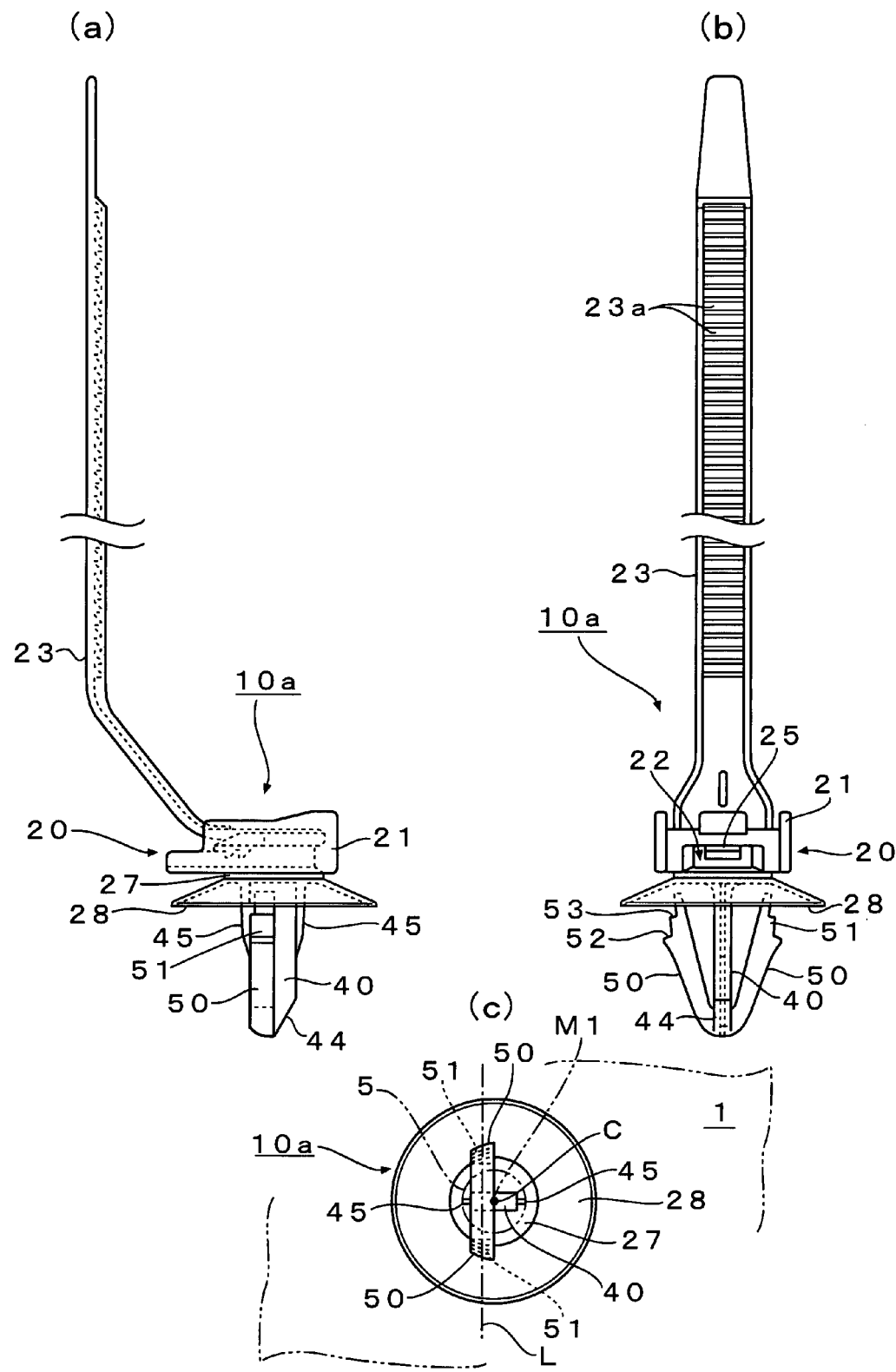

[Figure 13]
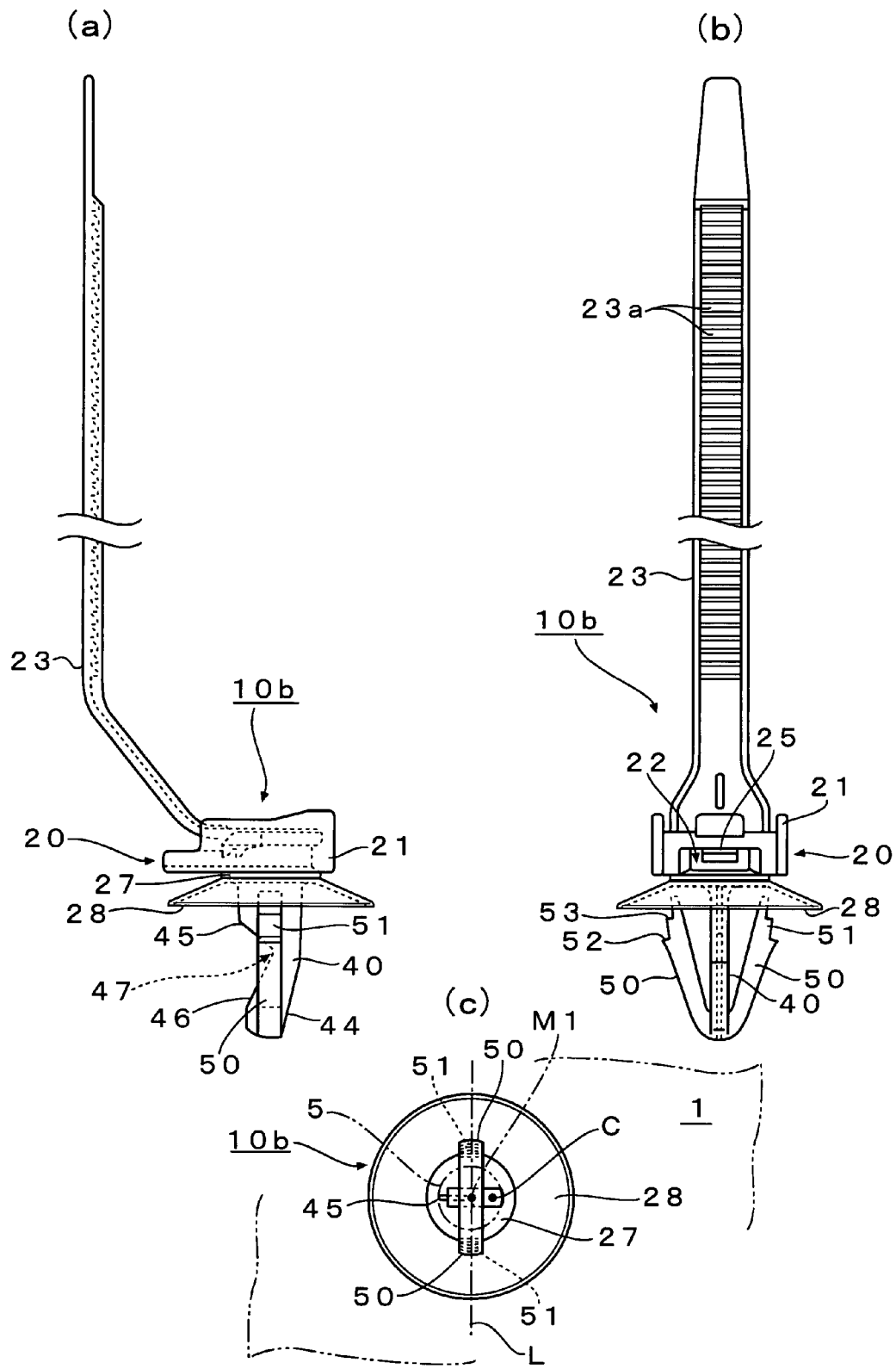

[Figure 14]
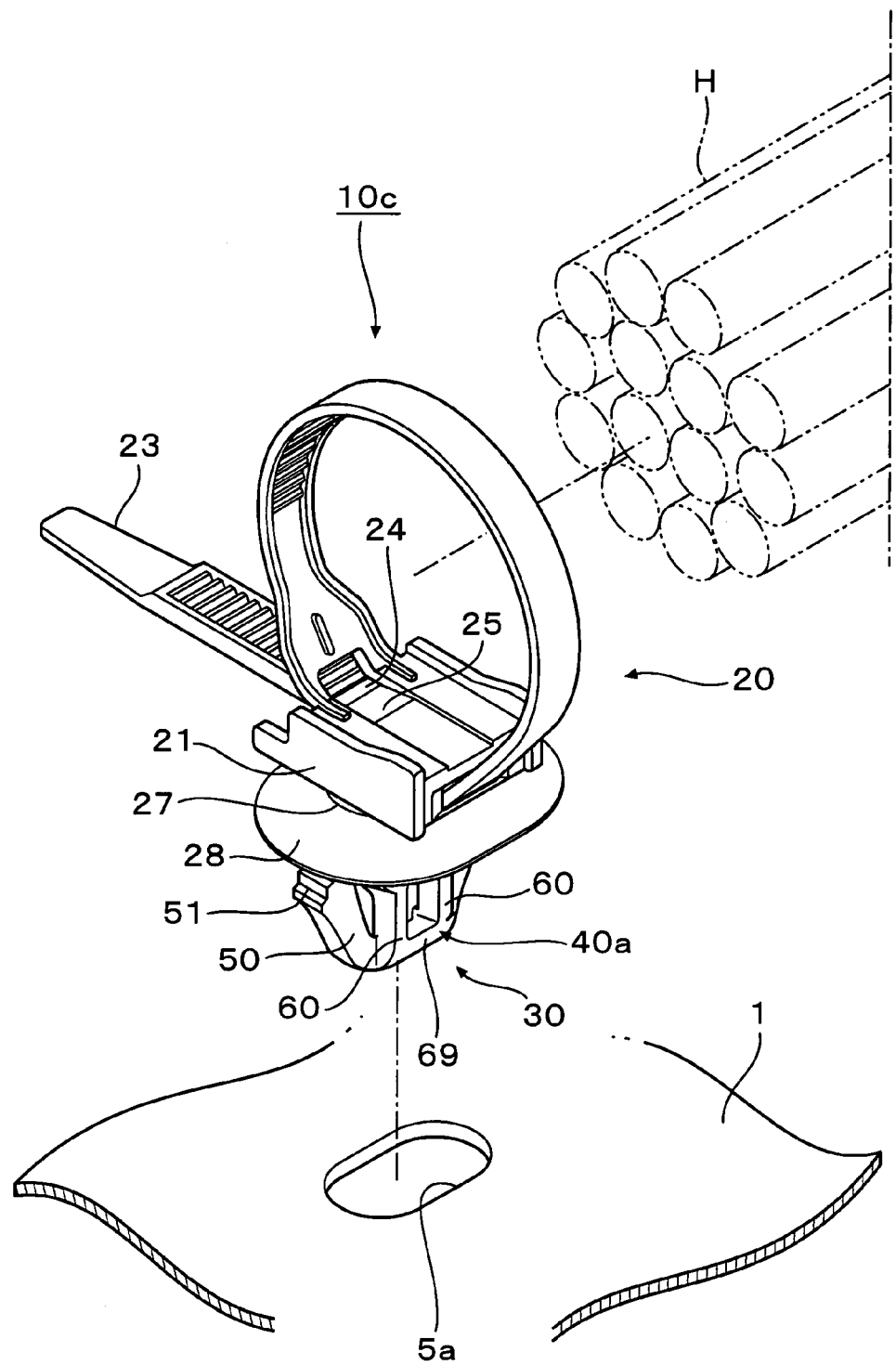

[Figure 15]
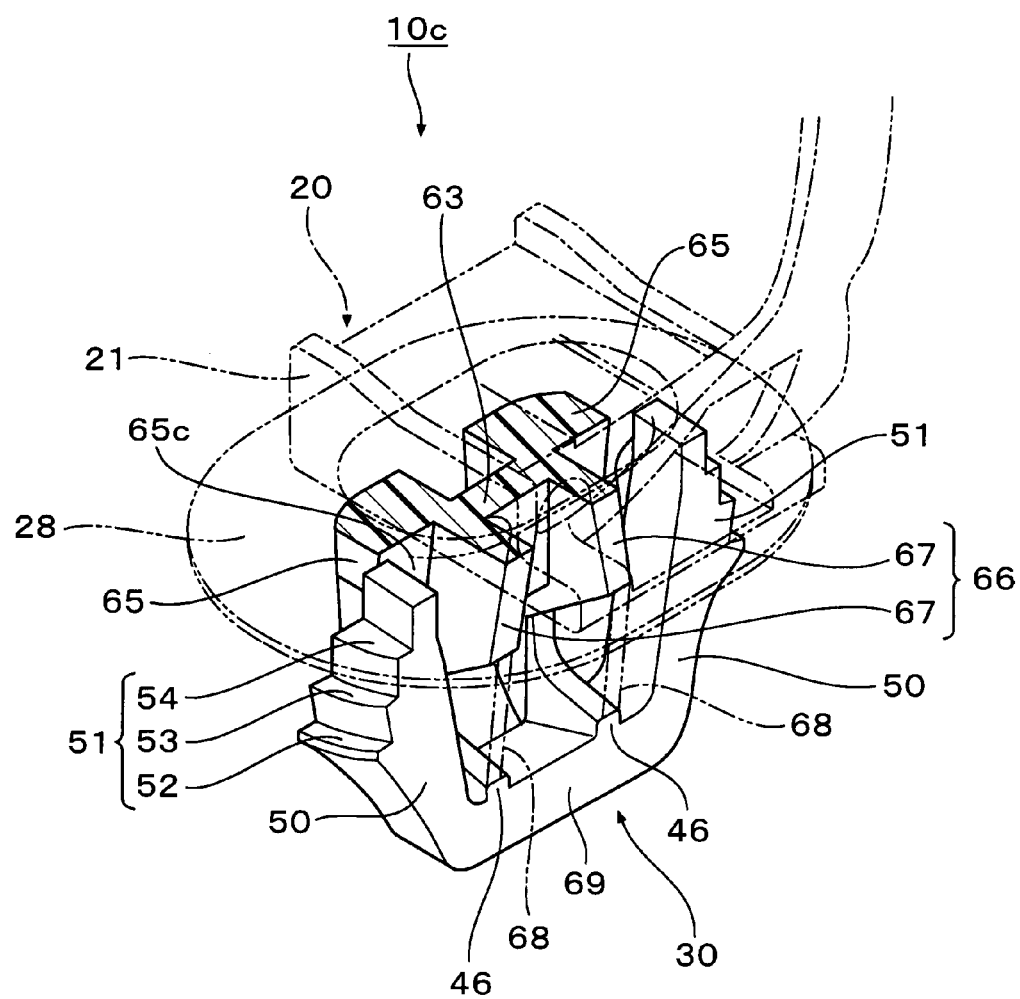

[Figure 16]
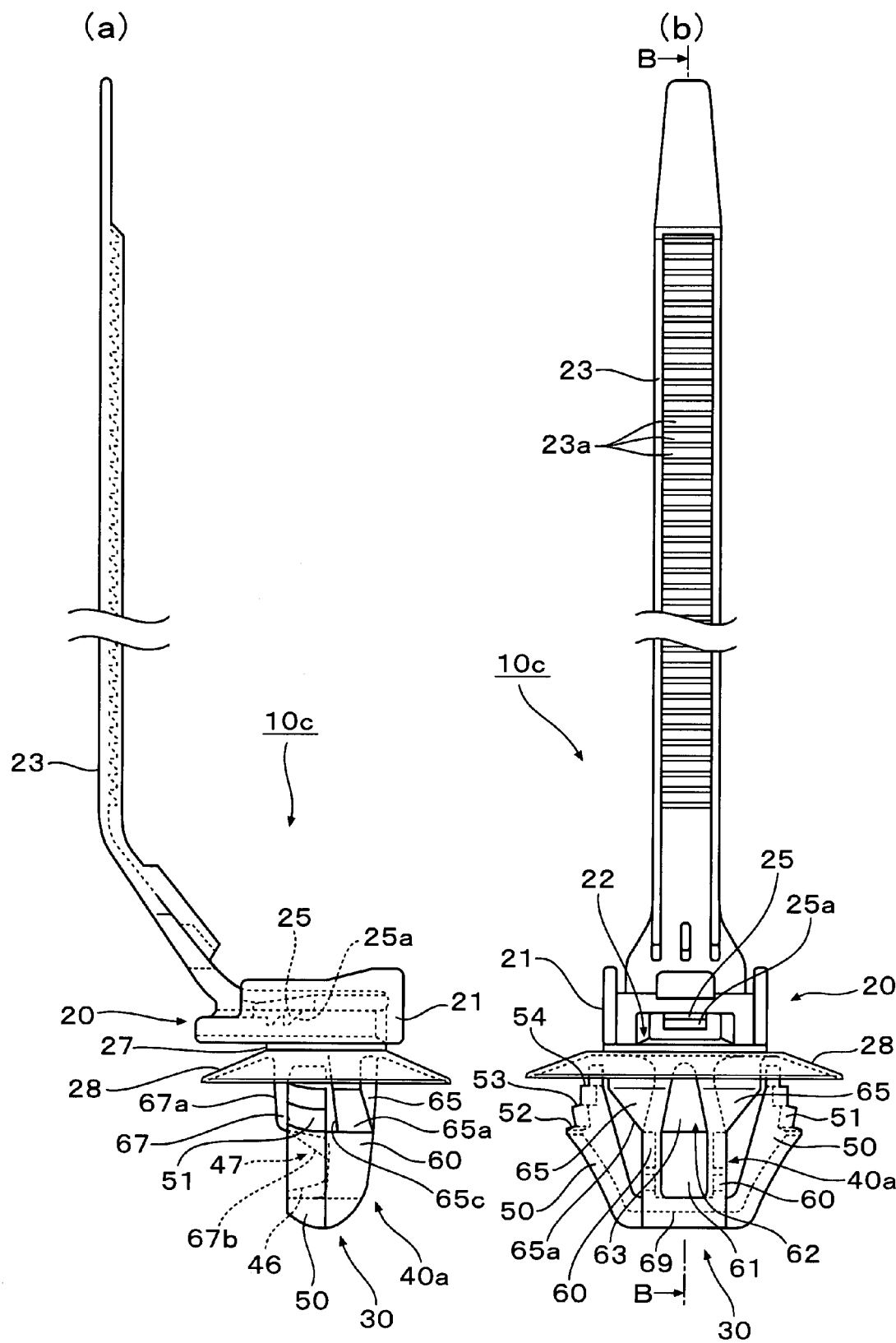

[Figure 17]
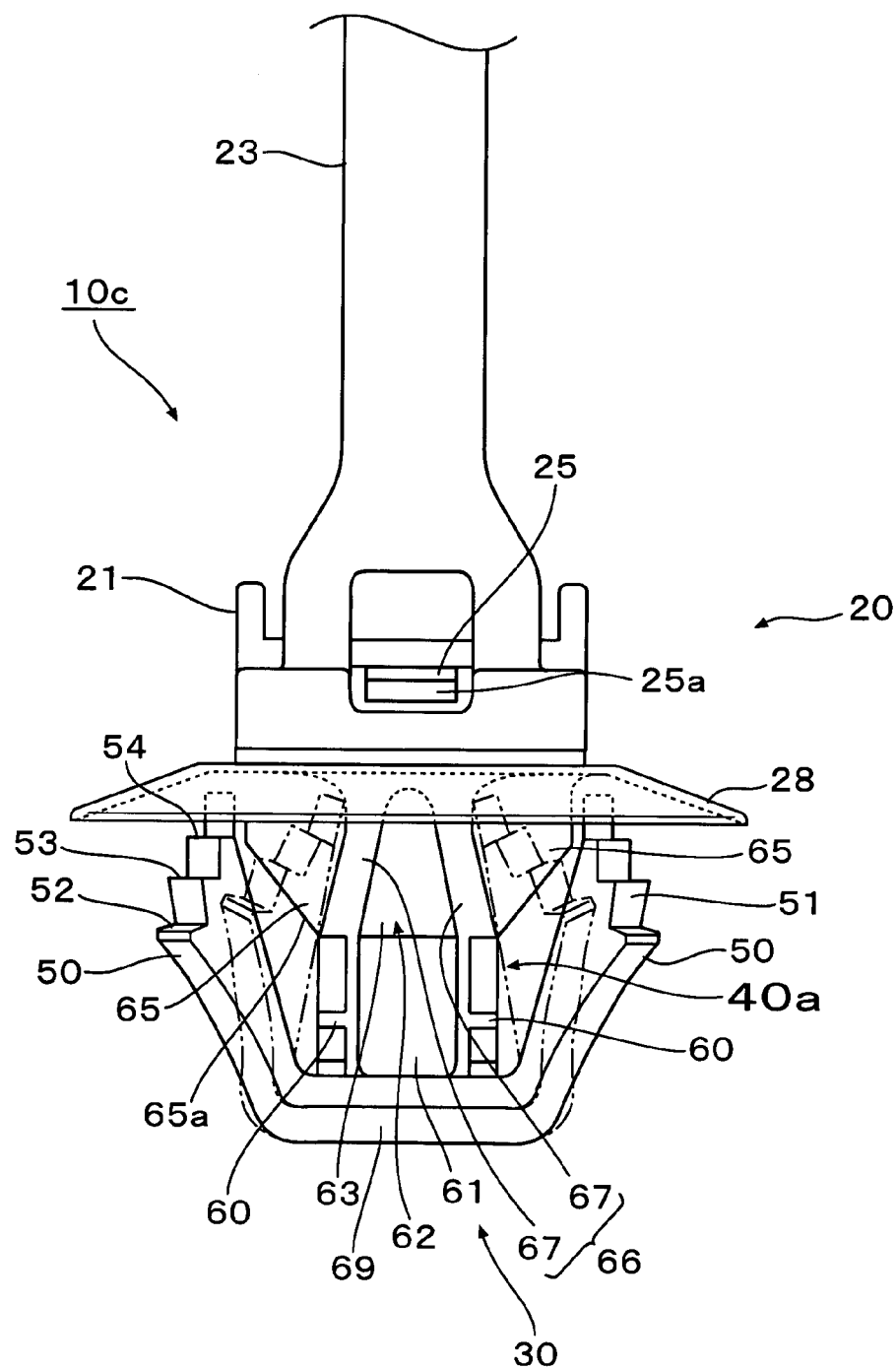

[Figure 18]
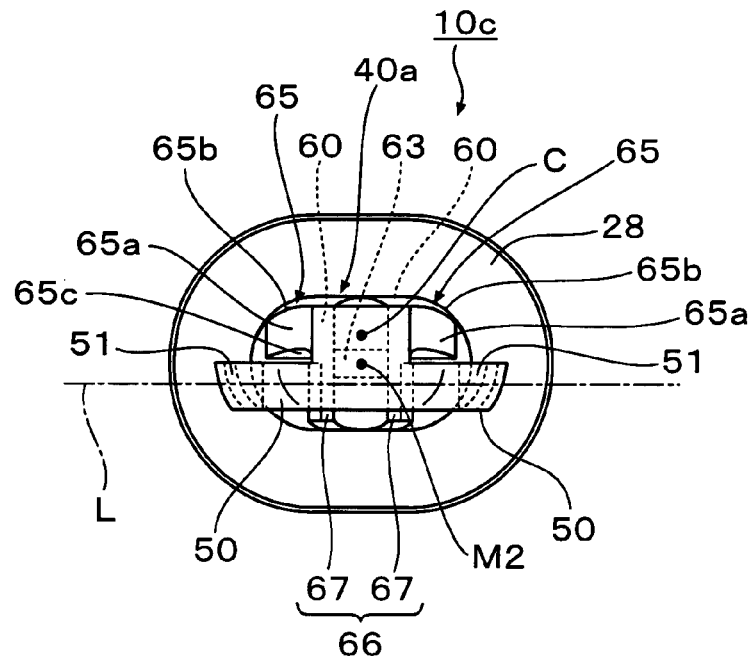
[Figure 19]
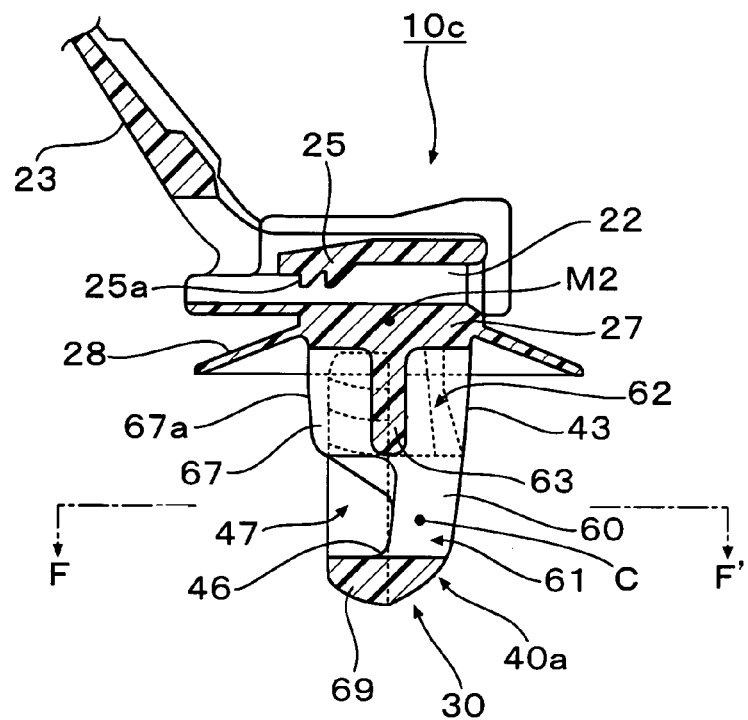

[Figure 20]
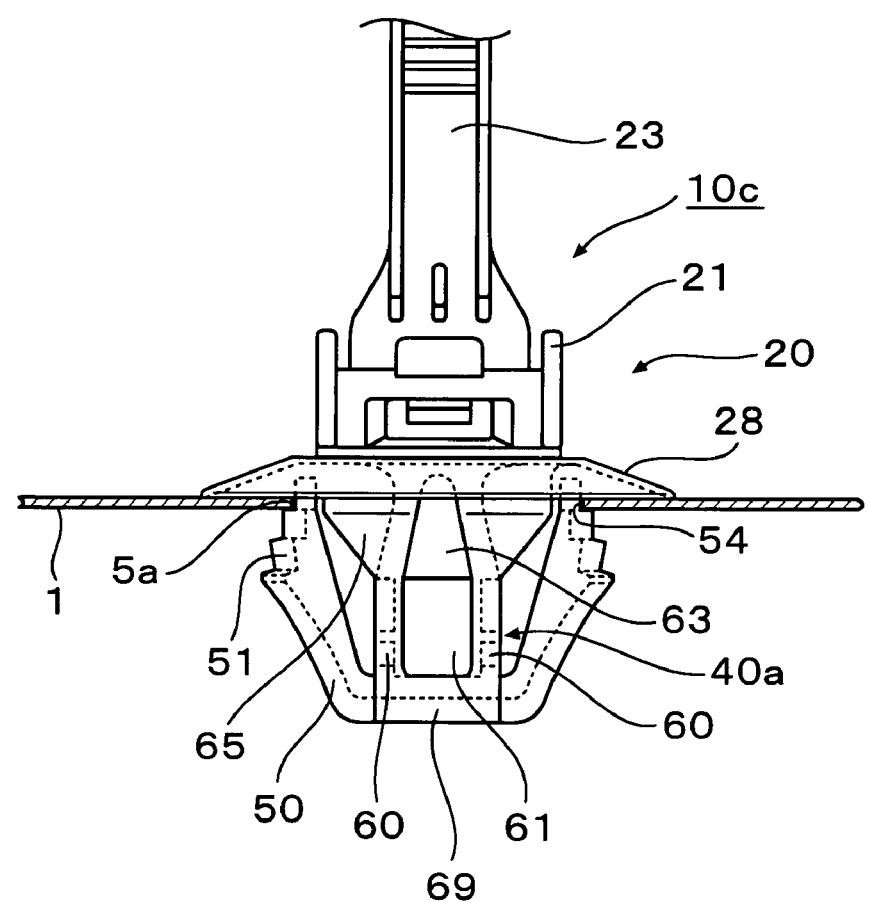

[Figure 21]
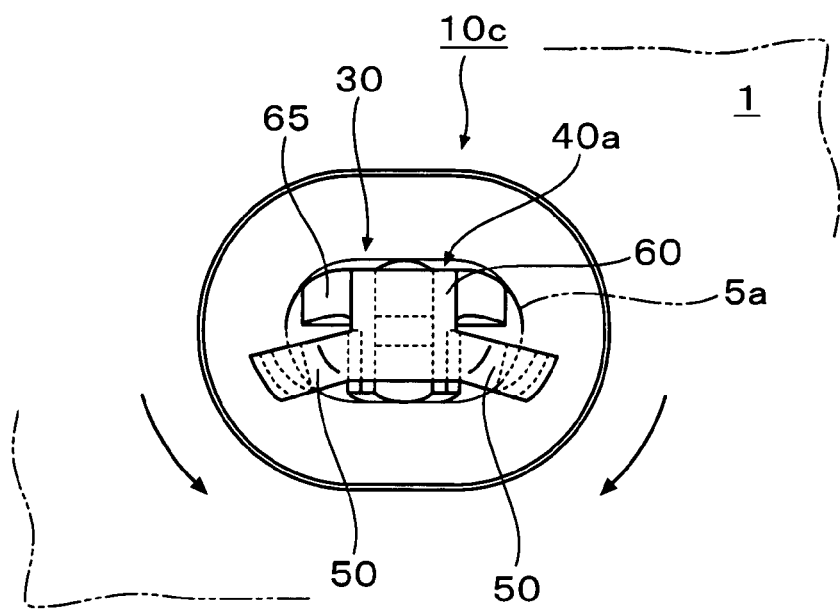

[Figure 22]
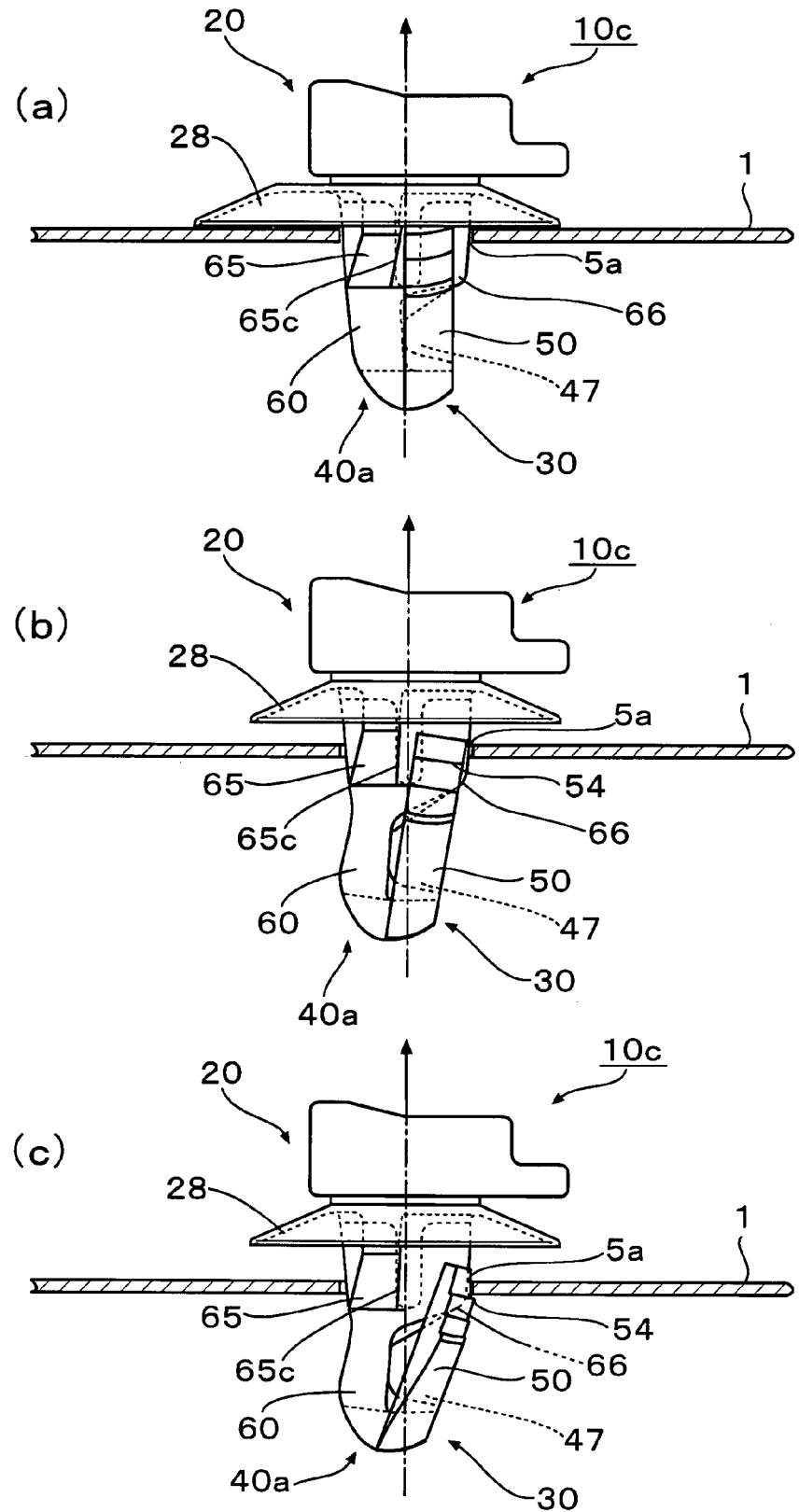

[Figure 23]
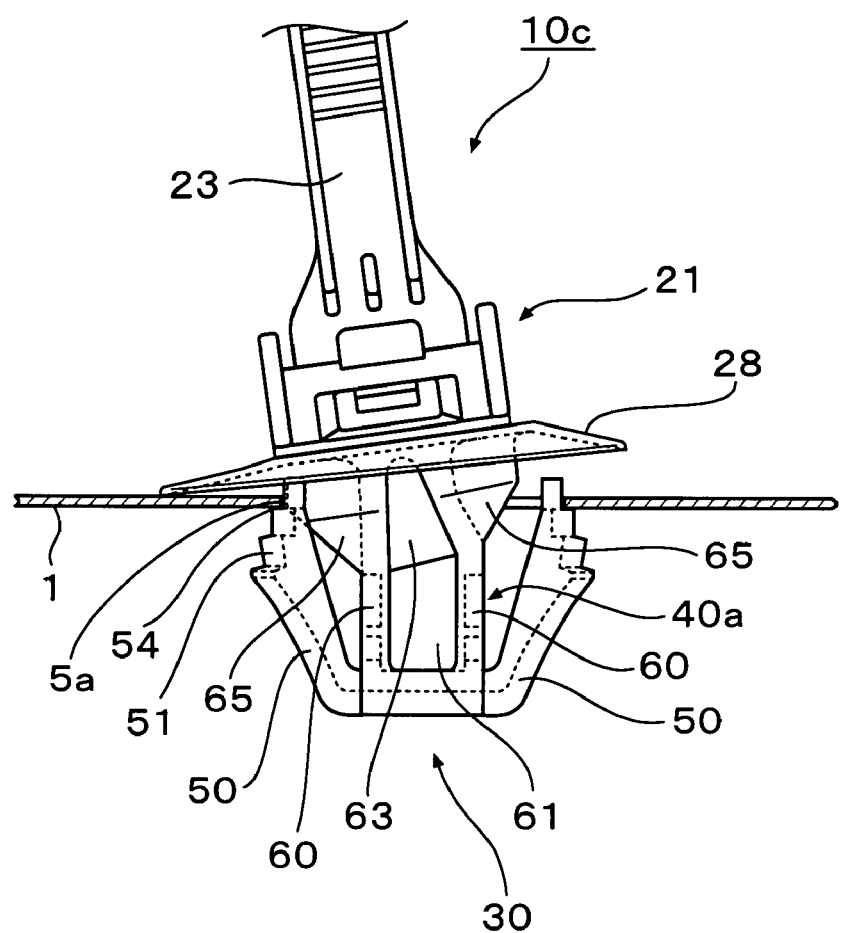

[Figure 24]
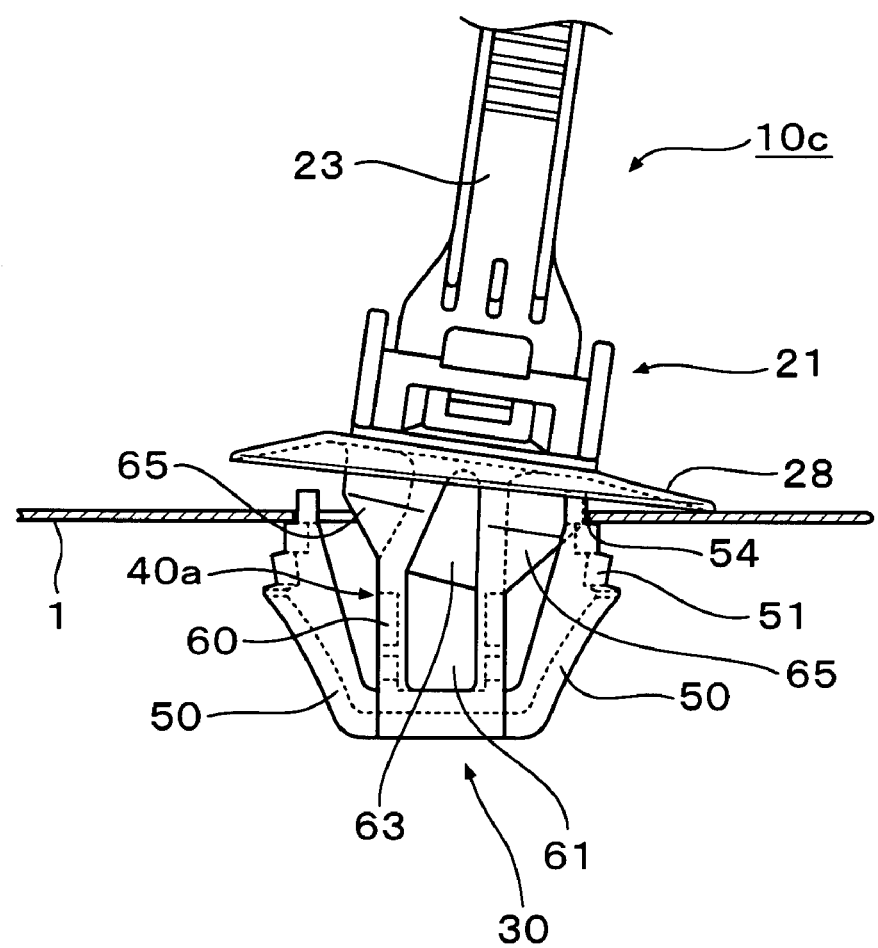

[Figure 25]
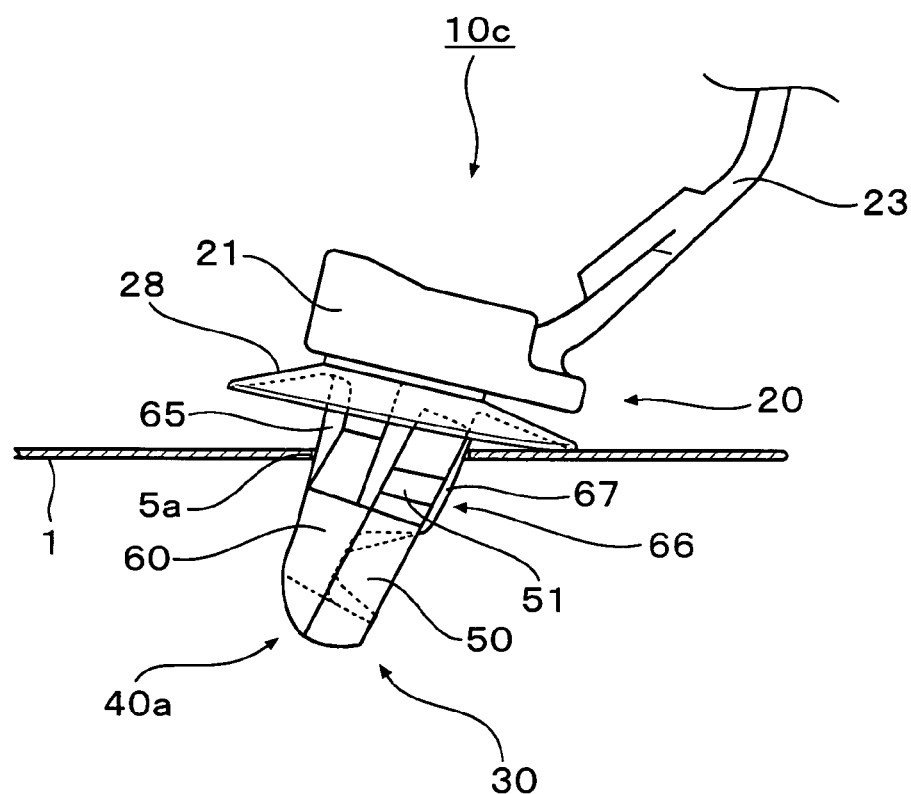

[Figure 26]
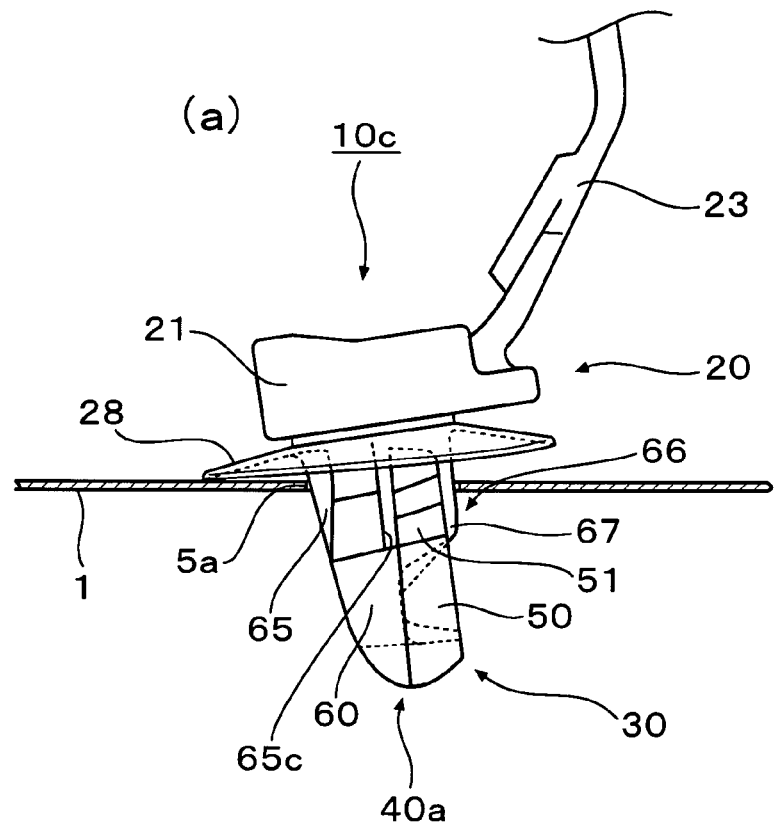
(a)
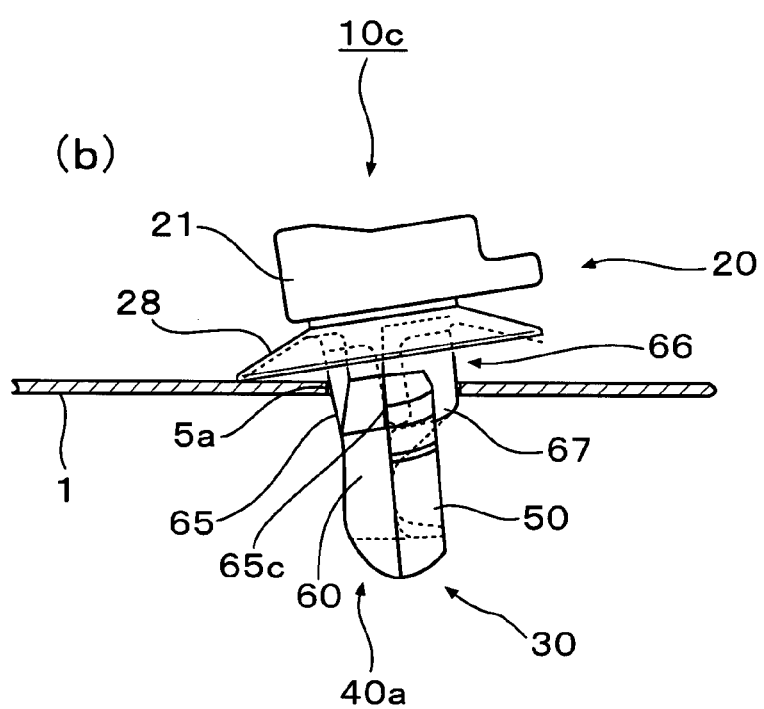
(b)

[Figure 27]
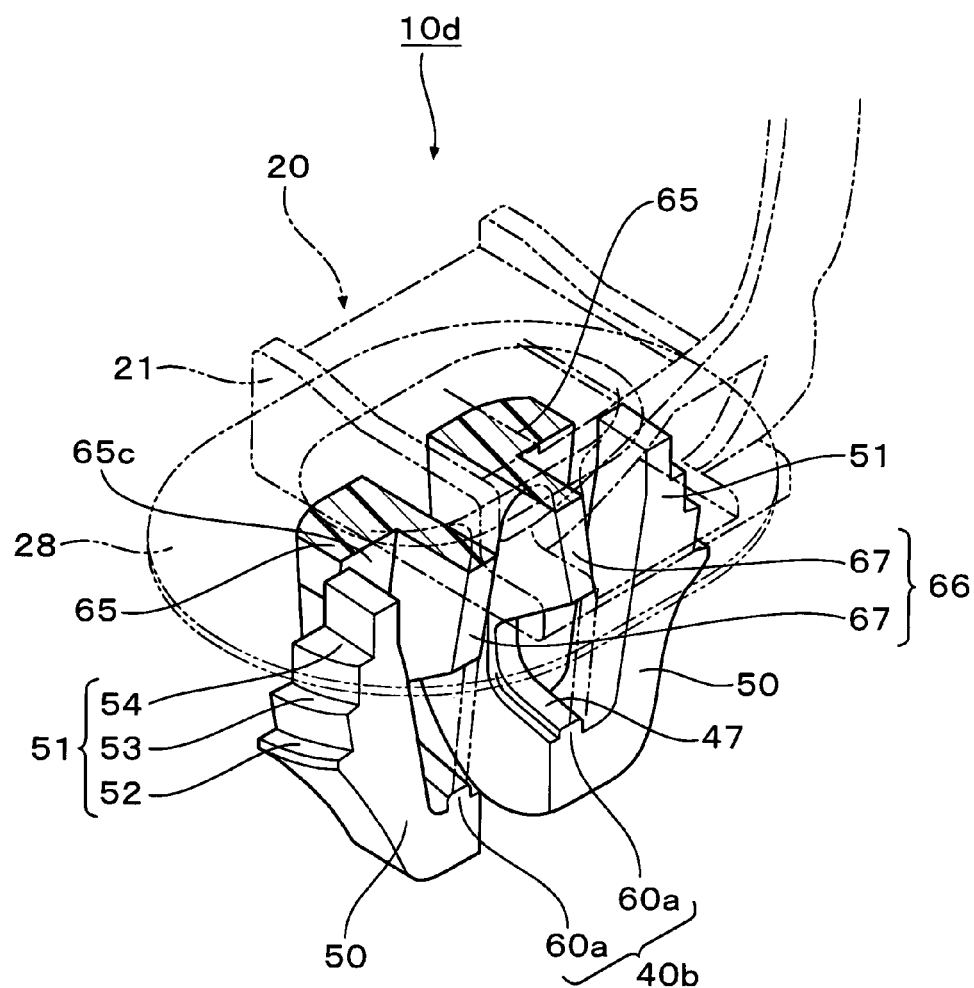

[Figure 28]
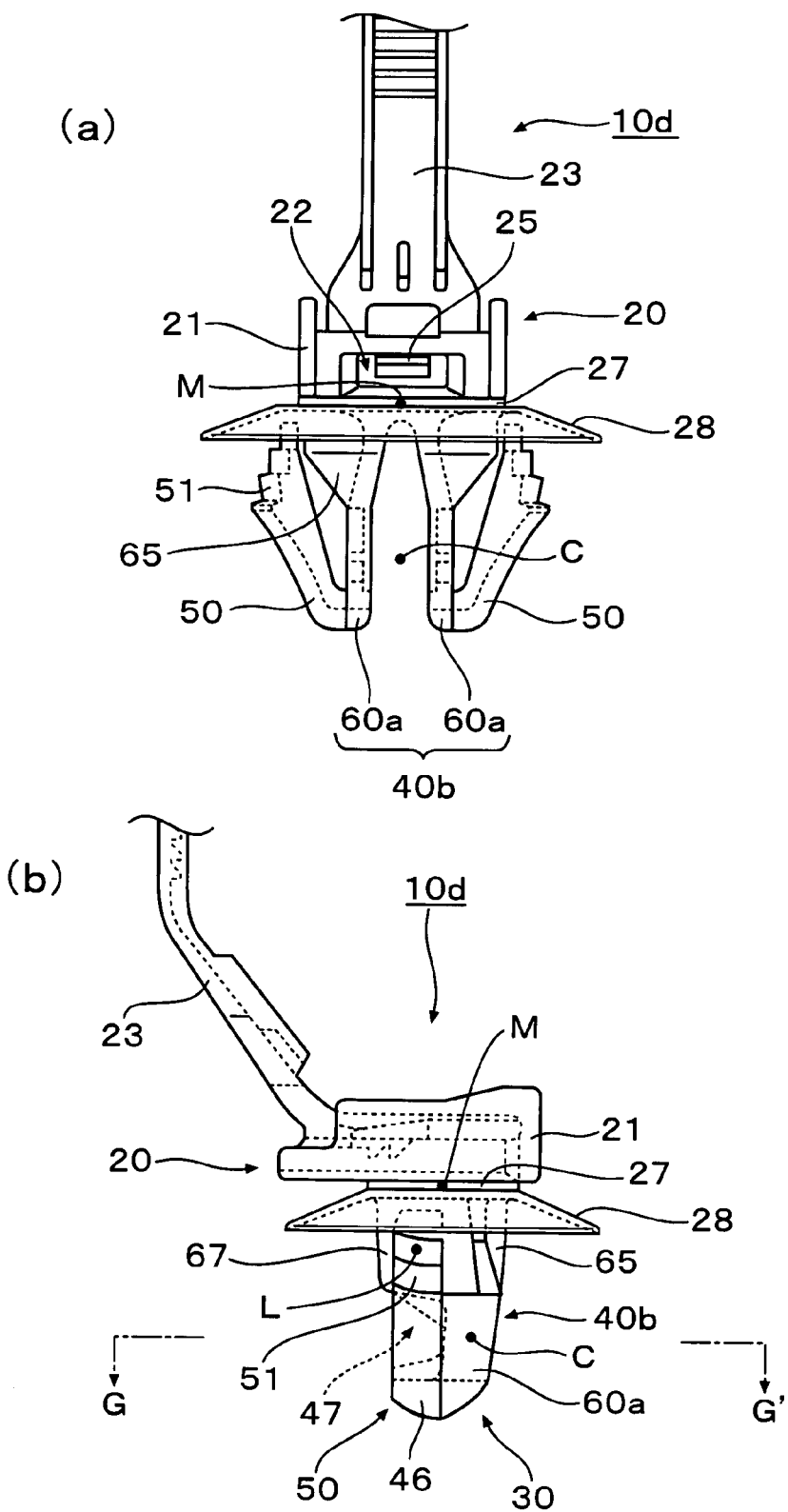

[Figure 29]
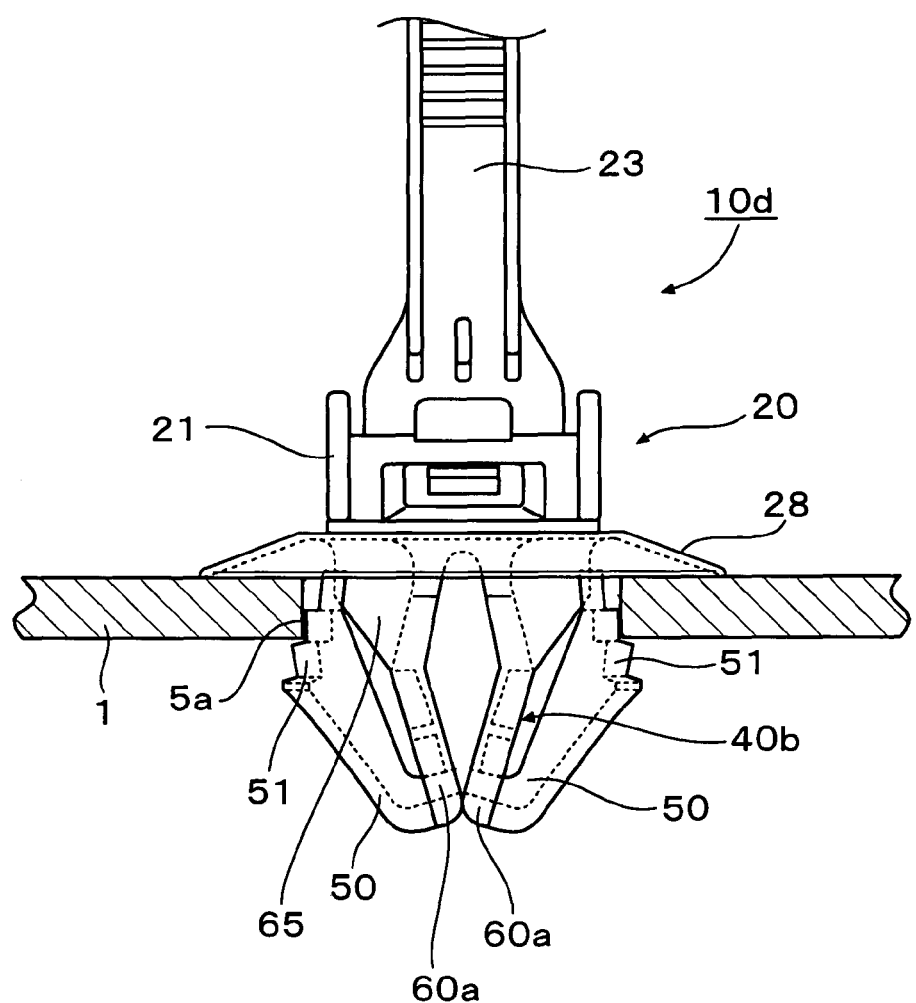

[Figure 30]
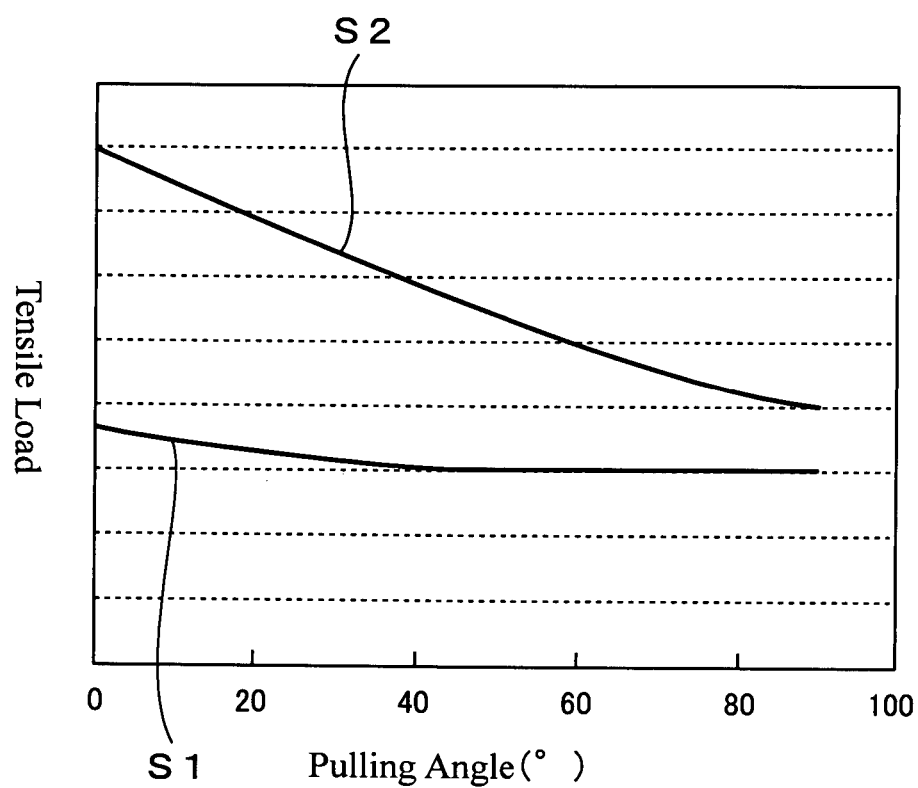

CLIP

BACKGROUND OF THE INVENTION

1. Field of the Invention

The present invention relates to a clip which can be attached to and detached from a mating member such as an automotive panel member.

2. Description of the Related Art

A clip may be used to fix a member, such as a harness or a cover member, to a mating member, for example, an automotive body panel. In some cases, such a component and the clip are to be detached from the mating member for replacement, recycling, etc. Japanese Utility Model Examined Publication No. Hei 01-19543 discloses a conventional clip of this type to be used to attach, in particular, a harness. The clip as disclosed in the publication includes a strip-like base plate, and a locking leg provided so as to be continuous with the base plate. The locking leg has a stem portion (support leg) provided upright on the lower surface of the base plate, a pair of elastic engagement members (spring members) extending from the forward end of the stem portion so as to be perpendicular to the length direction of the base plate, and open forward end portions formed by outwardly bending the forward end portions of the elastic engagement members. A harness is fixed to the upper surface of the base plate through tape-winding, and the locking leg is inserted into a mounting hole. Then, the pair of elastic engagement members is engaged with the peripheral edge of the mounting hole, whereby the harness is arranged on a vehicle body panel. On the other hand, when the open forward end portions at the ends of the elastic engagement members are pinched, the pair of elastic engagement members are inwardly deflected, so it is possible to detach the clip from the mounting hole, and to detach the harness from the vehicle body panel.

JP 09-217864 A discloses a clip which includes a strip-like base plate, and a substantially U-shaped locking leg provided so as to be continuous with the base plate. The locking leg is composed of a pair of locking members extending vertically from the lower surface of the base plate and having thin-walled portions at midways thereof, and a bottom plate connecting the locking members. Further, a support column is provided upright on the inner surface of the bottom plate, and a U-shaped lock recess is provided at the forward end of the support column, the lower surface of the base plate being provided with a lock protrusion formed thereon so as to be opposed to the lock recess. When the base plate is pushed in to thereby engage the lock protrusion with the lock recess, locking is effected, with the pair of locking members being obliquely deformed through the thin-walled portions. In this state, a harness is fixed to the upper surface of the base plate through tape-winding, and the locking leg is inserted into a mounting hole of a vehicle body panel. In this way, the pair of locking members obliquely deformed is engaged with the peripheral edge of the mounting hole, and the harness is arranged on the vehicle body panel. On the other hand, when the harness is pulled to extract the lock protrusion from the lock recess, the pair of locking members undergoes elastic deformation so as to be perpendicular to the base plate. As a result, it is possible to detach the clip by pulling the locking leg out of the mounting hole, and to detach the harness from the vehicle body panel.

In the case of Japanese Utility Model Examined Publication No. Hei 01-19543, when detaching the clip from the mounting hole, it is necessary to pinch the open forward end portions of the locking members to bring them close to each other to thereby deflect the pair of locking members, thus a rather difficult operation is involved, resulting in a problem with workability. In JP 09-217864 A, the lock recess provided on the inner side of the locking leg is U-shaped, with its upper side open. Therefore, if it is possible to pull the base portion perpendicularly to the mounting hole, the lock protrusion can be pulled out of the lock recess relatively easily. However, when the base portion is pulled obliquely, it is rather difficult to pull the lock protrusion out of the lock recess, and a large tensile load is required. Thus, there is a disadvantage in that the workability in the mounting operation depends upon the pulling angle when detaching the clip.

SUMMARY OF THE INVENTION

It is accordingly an object of the present invention to provide a clip which can be easily detached from the mounting hole solely by pulling the base portion thereof.

In order to achieve the above-mentioned object, the present invention provides a clip to be fixed to a mounting hole formed in a mating member, including:

- a base portion to engage with a front-side peripheral edge of the mounting hole; and
- a locking leg to be inserted into the mounting hole and to engage with a back-side peripheral edge of the mounting hole, the locking leg extending from the base portion, the locking leg comprising:
  - a stem portion formed of one or more of pillar-like members extending from the base portion; and
  - a pair of elastic engagement members, which extends in an anchor-fluke-like fashion from a forward end of the stem portion toward the base portion, and which is provided with engagement portions to engage with the back-side peripheral edge of the mounting hole at forward ends of said anchor-fluke-like portions,
- in which an axis of the stem portion and a line connecting the centers of the engagement portions of the pair of elastic members are offset from each other as seen in an axial direction of the stem portion.

According to the present invention, by inserting the locking leg into the mounting hole, the elastic engagement members pass the mounting hole while being deflected, and the engagement portions of the elastic engagement members are engaged with the back-side peripheral edge of the mounting hole for detachment prevention. In this way, the clip can be fixed to the mounting hole of the mating member.

When there arises a need to detach the clip from the mating member for repair, disposal, etc., the base portion is pulled strongly from the front side of the mounting hole. That is, when the base portion is pulled, a tensile force acts on the axis of the stem portion, and a detachment prevention force is exerted at the engagement portions of the elastic engagement members engaged with the back-side peripheral edge of the mounting hole. Then, the axis of the stem portion and the line connecting the centers of the engagement portions of the pair of elastic engagement members are deviated from each other as seen in the axial direction of the stem portion. Therefore, the pair of elastic engagement members move to the peripheral edge of the mounting hole situated in the middle thereof while being brought close to each other.

As a result, the stem portion gradually leaves the mounting hole while being warped in an arch, while the elastic engagement members and the stem portion are opening in a V-shape. In this process, the elastic engagement members are inclined, and the engagement portions thereof obliquely abut the peripheral edge of the mounting hole. A detachment prevention force is concentrated on the corner portions of the engagement portions, and the corner portions are deformed in the length direction as well as the thickness direction of the elastic engagement members. As a result, the engagement force is lost, and the stem portion is pulled out. At the same time, the elastic engagement portions are also pulled out, making it possible to detach the clip from the mounting hole.

In this way, the axis of the stem portion and the line connecting the engagement portions of the pair of elastic engagement members are deviated from each other as seen in the axial direction of the stem portion, whereby the clip can be detached relatively with ease solely by pulling the stem portion through the base portion. Further, the axis of the stem portion and the line connecting the engagement portions of the pair of elastic engagement members are deviated from each other. Therefore, in whichever direction the stem portion may be pulled through the base portion, the stem portion and the elastic engagement members are deformed while opening in a V-shape to allow extraction. As a result, not depending upon the pulling direction, the detachment operation is easily facilitated.

In the present invention, the axis of the stem portion refers to a position constituting the center of gravity when making assumption that the cross section of the minimum diameter portion of the stem portion taken in a direction perpendicular to the axial direction has a weight corresponding to the area thereof. When the stem portion is composed of a plurality of columnar members, the center of gravity of the cross section of the minimum diameter portion of each columnar member is obtained. In this case, the axis of the stem portion refers to a position allowing the balance when making assumption that weights corresponding to the sectional areas are applied to their respective centers of gravity of those cross sections.

In a preferable mode of the present invention, in a state in which the clip is fixed to the mounting hole, the axis of the stem portion is offset with respect to the center of the mounting hole, and the line connecting the engagement portions of the pair of elastic engagement members is offset with respect to the center of the mounting hole in a direction opposite to the axis of the stem portion.

According to the above mode, the locking leg can be arranged to be deviated further from the stem portion. Therefore, when the stem portion is pulled through the base portion, deformation easily occurs, with the stem portion and the elastic engagement members opening in a V-shape, thus further easily facilitating the detaching operation.

In a more preferable mode of the present invention, the engagement portions of the elastic engagement members are provided with large-width portions spreading toward the stem portion along the periphery of the mounting hole.

According to the above mode, the engagement portions of the elastic engagement members are provided with large-width portions enlarged toward the stem portion. As a result, the area of engagement with the mounting hole can be enlarged, making it possible to enhance the detachment prevention force at the time of fixation.

In the above mode, it is more preferable that the large-width portions of the elastic engagement members be thinner than the remaining portions of the elastic engagement members and be arranged toward the outer periphery.

According to the above mode, the large-width portions enlarged toward the stem portion are formed in a small thickness and arranged on the outer periphery side. Therefore, when the elastic engagement members are deflected, the stem portion gets behind the large-width portions, making it possible to make the elastic engagement members further close to each other. Thus, even if the length of the locking leg is small, the deflection margin for the elastic engagement members can be enlarged, and there is no need to elongate the locking leg in order to obtain the requisite deflection margin, making it possible to make the locking leg compact. Further, the large-width portions are the portions where the engagement portions of the pair of elastic engagement members are inclined and obliquely abut the peripheral edge of the mounting hole. As a result, deformation due to stress concentration occurs easily, thereby enabling the clip to be pulled out easily.

In a more preferable mode of the present invention, the stem portion is provided with a tapered surface formed at one side portion thereof, which is on a proximal side of the stem portion and an opposite side of the elastic engagement members, the surface gradually protruding outwards toward the base portion.

According to the above mode, the stem portion has a tapered surface formed at one side portion thereof, which is on a proximal side of the stem portion and an opposite side of the elastic engagement members, the surface gradually protruding outwards toward the base portion. Therefore, when the base portion is pulled in order to detach the clip, the above-mentioned one side portion of the stem portion slides smoothly on the inner periphery of the mounting hole to be pulled out, whereby the detachment operation is easily facilitated.

In a more preferable mode of the present invention, the stem portion is provided with a proximal side rib formed at one side portion thereof, which is on a proximal side of the stem portion and on the elastic engagement member side, the proximal side rib protruding toward the elastic engagement members and having a size adapted to an inner diameter of the mounting hole.

According to the above mode, when the stem portion is passed through the mounting hole, a rib of a size adapted to the inner diameter of the mounting hole abuts the inner periphery of the mounting hole. As a result, the movement of the stem portion in the mounting hole is restricted, making it possible to prevent the clip from rattling.

In the above mode, it is preferable that the stem portion is provided with a forward end side rib formed at one side portion thereof, which is on a forward end portion side of the stem portion and on the elastic engagement member side, the forward end side rib gradually increasing in width toward the forward end portion of the stem portion and toward the elastic engagement members, such that a valley-shaped cutout portion is provided between the proximal side rib and the forward end side rib.

According to the above mode, when the base portion is pulled to extract the stem portion from the mounting hole, the stem portion is bent at the cutout portion to facilitate the deformation. As a result, the clip can be easily pulled out of the mounting hole.

In a more preferable mode of the present invention, the stem portion is provided with a tapered surface formed at one side portion thereof, which is on a forward end portion side of the stem portion and an opposite side of the elastic engagement members, the surface gradually reduced in diameter toward the forward end of the stem portion.

According to the above mode, the stem portion has a tapered surface formed at one side portion thereof, which is on a forward end portion side of the stem portion and an opposite side of the elastic engagement members, the surface gradually reduced in diameter toward the forward end of the stem portion. Therefore, when extracting the forward end portion of the stem portion from the mounting hole, the tapered surface is not easily caught by the inner periphery of the mounting hole, making it possible for the stem portion to be smoothly pulled out of the mounting hole. Further, also when inserting the locking leg portion into the mounting hole to fix the clip, the forward end portion of the stem portion is not easily caught by the inner periphery of the mounting hole, so its insertion is easily operated.

In a more preferable mode of the present invention, the stem portion is composed of two pillar-like members, and the elastic engagement members extend from the forward ends of the pillar-like members so as to exhibit an anchor-fluke-like configuration as a whole.

According to the above mode, the stem portion is composed of two columnar members, so the stem portion tends to deform at the time of detachment of the clip, thereby making it easy to pull out the locking leg of the clip from the mounting hole.

In the above mode, it is preferable that the stem portion is provided with a connecting rib formed at the proximal portion thereof to thereby connect the two pillar-like members.

According to the above mode, a rib connects the two columnar members, so the stem portion is not easily twisted, making it possible to apply an increased pull-out load during use.

In a more preferable mode of the present invention, the stem portion is formed of a single pillar-like member, the single pillar-like member having a through-hole extending in a direction perpendicular to the line connecting the centers of the engagement portions of the pair of elastic engagement members such that the stem portion is forked halfway.

According to the above mode, the midway of the stem portion is forked. When detaching the clip, the stem portion undergoes deformation more easily than the one whose stem portion is not forked, enabling the locking leg of the clip to be easily pulled out of the mounting hole. Further, as compared with the one whose stem portion is composed of two columnar members completely separate from each other, more increased pull-out load can be applied during use.

In the above mode, it is preferable that the stem portion is provided with a connecting rib formed at the proximal portion thereof to thereby connect the forked pillar-like member.

According to the above mode, a rib connects the proximal portions of the forked columnar members, so the stem portion is not easily twisted, making it possible to apply an increased pull-out load during use.

In a more preferable mode of the present invention, the stem portion is provided with a restriction rib formed at the proximal portion thereof, such that the restriction rib is situated on the stem portion side with respect to the elastic engagement members when the pair of elastic engagement members are inwardly deflected, to thereby restrict movement of the elastic engagement members toward the stem portion.

According to the above mode, a restriction rib is arranged on the stem portion side of the elastic engagement member, in the state in which the elastic engagement member of the locking leg be inwardly deflected to engage with the mounting hole of the mating member, thereby preventing falling of the elastic engagement member to the stem portion side. Therefore, the deformation mode of the elastic engagement member at the time of detachment of the clip is constant, making it possible to stabilize the pull-out load applied.

In the above mode, it is preferable that the surface of the restriction rib opposed to the elastic engagement member be inclined away from the elastic engagement member as the surface extends away from the base portion.

According to the above mode, even if, at the time of detachment of the clip, the elastic engagement member abuts the restriction rib, it moves along the inclined surface of the restriction rib. As a result, the clip easily undergoes deformation, making it possible to easily detach the clip.

In a more preferable mode of the present invention, the stem portion is provided with a protrusion formed at the proximal portion thereof, the protrusion situated between the pair of elastic engagement members to protrude toward the elastic engagement members so as to be adapted to the inner periphery of the mounting hole, in which the distance between both side surfaces of the protrusion is gradually reduced toward the base portion.

According to the above mode, the protrusion is fitted to the inner periphery of the mounting hole, whereby the clip can be fixed to the mounting hole without rattling. Further, since both side surfaces of the protrusion are gradually narrowed toward the base portion. Therefore, when the elastic engagement member is inwardly deflected, it can be deflected to a sufficient degree without being restricted by the protrusion.

According to the clip of the present invention, the axis of the stem portion and the line connecting the centers of the engagement portions of the pair of elastic engagement portions are deviated from each other as seen in the axial direction of the stem portion. Therefore, when the base portion, in the state in which the clip be fixed to the mounting hole of the mating member, is pulled strongly from the front side of the mounting hole, due to the tensile force exerted on the axis of the stem portion and the detachment prevention force applied to the engagement portions, the pair of elastic engagement members move on the peripheral edge of the mounting hole while coming close to each other. As a result, the stem portion gradually leaves the mounting hole while being warped in an arch, with the elastic engagement members and the stem portion opening in a V-shape. Simultaneously with the detachment of the stem portion, the elastic engagement members are pulled out, making it possible to detach the clip from the mounting hole. Thus, the clip can be detached relatively with ease solely by pulling the stem portion through the base portion. Further, the axis of the stem portion and the line connecting the engagement portions of the pair of elastic engagement members are deviated from each other. Therefore, in whichever direction the stem portion may be pulled through the base portion, the stem portion and the elastic engagement members are deformed while opening in a V-shape to allow extraction. As a result, not depending upon the pulling direction, the detachment operation is easily facilitated.

BRIEF DESCRIPTION OF THE DRAWINGS

In the accompanying drawings:

FIG. 1 is an exploded perspective view of a clip according to a first embodiment of the present invention;

FIG. 2A is a front view, and FIG. 2B is a right-hand side view of the clip;

FIG. 3 is a bottom view of the clip;

FIG. 4 is a sectional view taken along the arrow line A-A of FIG. 2B;

FIG. 5 is an explanatory view of the clip of the present invention as fixed to a mating member;

FIG. 6A is a front view, FIG. 6B is a sectional view, and FIG. 6C is a bottom view of the clip, illustrating a first step of detaching the clip from the mating member;

FIG. 7A is a front view, FIG. 7B is a sectional view, and FIG. 7C is a bottom view of the clip, illustrating a second step of detaching the clip from the mating member;

FIG. 8A is a front view, FIG. 8B is a sectional view, and FIG. 8C is a bottom view of the clip, illustrating a third step of detaching the clip from the mating member;

FIG. 9 is an explanatory view of the clip as completely detached from the mating member;

FIG. 10 is a perspective view of another configuration of the base portion of the clip;

FIG. 11 is a perspective view of still another configuration of the base portion of the clip;

FIG. 12A is a front view, FIG. 12B is a right-hand side view, and FIG. 12C is a bottom view of a clip according to a second embodiment of the present invention;

FIG. 13A is a front view, FIG. 13B is a right-hand side view, and FIG. 13C is a bottom view of a clip according to a third embodiment of the present invention;

FIG. 14 is an exploded perspective view of a clip according to a fourth embodiment of the present invention;

FIG. 15 is a perspective view of the clip as seen from the rear side of FIG. 14;

FIG. 16A is a front view, and FIG. 16B is a right-hand side view of the clip;

FIG. 17 is an enlarged left-hand side view of the main portion of the clip;

FIG. 18 is a bottom view of the clip;

FIG. 19 is a sectional view taken along the arrow line B-B of FIG. 16B;

FIG. 20 is an explanatory view of the clip as fixed to the mating member;

FIG. 21 is a bottom view of the clip, showing how the locking leg is deformed when the clip is detached from the mating member;

FIG. 22A is an explanatory view of a first step, FIG. 22B is an explanatory view of a second step, and FIG. 22C is an explanatory view of a third step in the deformation of the locking leg when detaching the clip from the mating member;

FIG. 23 is an explanatory view showing how the locking leg is deformed when the clip is pulled at a first pulling angle;

FIG. 24 is an explanatory view showing how the locking leg is deformed when the clip is pulled at a second pulling angle;

FIG. 25 is an explanatory view showing how the locking leg is deformed when the clip is pulled at a third pulling angle;

FIG. 26A is an explanatory view of a first step, and FIG. 26B is an explanatory view of a second step in the deformation of the locking leg when the clip is pulled at a fourth pulling angle;

FIG. 27 is a perspective view of a clip according to a fifth embodiment of the present invention;

FIG. 28A is a right-hand side view, and FIG. 28B is a front view of the clip;

FIG. 29 is an explanatory view showing how the locking leg is deformed when the clip is detached from the mating member; and FIG. 30 is a diagram showing the relationship between tensile load and pulling angle in a test in which a clip is detached from a mating member.

DESCRIPTION OF THE PREFERRED EMBODIMENTS

In the following, a clip according to the first embodiment of the present invention will be described with reference to FIGS. 1 through 11.

As shown in FIG. 1, a clip 10 is used, for example, to attach a harness H composed of a plurality of electric wires bundled together to a mating member 1 such as an automotive panel member. The clip 10 is mainly composed of a base portion 20 to be held in contact with the front side peripheral edge of a mounting hole 5 formed in the mating member 1, and a locking leg 30 extending from the base portion 20 and passed through the mounting hole 5 to be engaged with the back side peripheral edge thereof.

While the clip 10 is used to attach the harness H to the mating member 1, it may also be used, for example, to fix an interior member (e.g., garnish or trim board) to a mating member such as an automotive panel member, or to connect together a plurality of panel members. The clip 10 may be formed integrally with a component to be fixed to a mating member such as a sun visor holder or a hook.

Referring also to FIGS. 2A, 2B and 4, the base portion 20 for fastening the harness H has a frame-like lock portion 21 with a band insertion path 22, a band portion 23 extending from an end edge at one side portion on the upper side of the lock portion 21, and a lock claw 25 formed at one side portion of the upper surface of the lock portion 21 so as to be capable of being bent downwardly via a U-shaped slit 24 (see FIG. 1) and deflectable. A plurality of engagement grooves 23a are provided in a saw-teeth-like fashion in the longitudinal direction on one side of the band portion 23, and a plurality of engagement claws 25a are provided on the lower surface of the lock claw 25. When the band portion 23 is inserted into the ban insertion path 22, the engagement claws 25a are engaged with the engagement grooves 23a, whereby the lock claw 25 is engaged stepwise with the band portion 23 (see FIGS. 6B, 7B, and 8B). In this way, the band portion 23 fastens the harness H.

The device for fixing the harness H to the base portion 20 is not restricted to this mode. For example, as shown in FIG. 10, it is also possible to provide a plate-like base portion 20a extending in a strip-like fashion, and place the harness H on the base portion 20a and wind tapes T around them, thus fixing the harness by a so-called tape-winding method. As shown in FIG. 11, the base portion used in the tape-winding method may also be a T-shaped base portion 20b. The type of base portion may be determined as appropriate according to the arrangement position of the harness H, etc.

A columnar shaft portion 27 is formed on the lower surface of the lock portion 21. The center of gravity of the shaft portion 27 is indicated by reference numeral M2 (see FIGS. 3 and 5). Connected to the outer periphery of the shaft portion 27 is a flange portion 28 spread obliquely downwards in a skirt-like fashion. As shown in FIG. 5, the flange portion 28 is elastically held in contact with the front side peripheral edge of the mounting hole 5 of the mating member 1, serving to suppress rattling of the clip 10, etc. The flange portion 28 is not always held in direct contact with the front side peripheral edge of the mounting hole 5 of the mating member 1. When, for example, a trim member or the like is arranged on the upper surface of the mating member 1, it may be held in indirect contact with the front side peripheral edge of the mounting hole 5 through the intermediation of the trim member.

Further, below the shaft portion 27, there is mounted the locking leg 30, which is composed of a stem portion 40 formed of a single pillar-like member extending from a position offset from the axis M2, and a pair of elastic engagement members 50 extending in an anchor-fluke-like fashion from the forward end of the stem portion 40, which is in a position offset with respect to the axis M2 in a direction opposite to the stem portion 40.

The stem portion 40 formed of a pillar-like member extends by a predetermined length from the lower surface of the shaft portion 27 of the base portion 20. As shown in FIG. 3, an axis C of the stem portion 40 is offset in a radial direction by a predetermined distance from the axis M2 of the shaft portion 27. In the state in which the clip 10 is fixed in position, the axis M2 of the shaft portion 27 is at a position identical with the center M1 of the mounting hole 5, so the axis C of the stem portion 40 is offset with respect to the center M1 of the mounting hole 5 (see FIG. 5).

In the present invention, the axis C of the stem portion 40 refers to the position constituting the center of gravity of the cross section, taken in a direction perpendicular to the axial direction, of the minimum diameter portion of the stem portion 40. For example, in the case of this embodiment, it is the position constituting the center of gravity of the cross section taken along the arrow line E-E' of FIG. 4. In this case, the center of gravity of the cross section means the position of the center of gravity when making assumption that the cross section has a weight corresponding to the area.

Further, as shown in the side view of FIG. 2B, the proximal portion of the stem portion 40 is formed relatively thick. Starting from a midway in the axial direction thereof, the stem portion 40 has inclined surfaces 41 so as to be gradually diminished in thickness, that is, it is tapered toward the forward end. The portion of the stem portion 40 on the forward end side with respect to the inclined surfaces 41 are thinner than the proximal portion thereof. Thus, the proximal portion of the stem portion 40 has high rigidity and can be firmly mounted to the mounting hole 5, while the forward end portion thereof can be easily deformed when the stem portion 40 is pulled out of the mounting hole 5.

As shown in the front view of FIG. 2A, on the proximal side of the stem portion 40 above the inclined surfaces 41 and at one side portion on the side opposite to the elastic engagement members 50, there is formed a first tapered surface 43 protruding gradually outwards toward the base portion 20, enabling the stem portion 40 to be easily pulled out of the mounting hole 5. Further, on the forward end side of the stem portion 40 below the inclined surfaces 41 thereof, and at one side portion on the side opposite to the elastic engagement members 50, there is formed a second tapered surface 44 extending toward the forward end of the stem portion 40 and gradually diminished in size. Thus, when pulling the stem portion 40 out of the mounting hole 5, it is prevented from being caught by the inner periphery of the mounting hole 5, and the insertion of the stem portion 40 into the mounting hole 5 is facilitated.

On the proximal side of the stem portion 40 and at one side portion on the elastic engagement member 50 side, there protrudes, in order to restrict the movement of the stem portion 40 within the mounting hole 5 when the stem portion 40 is inserted into the mounting hole 5, a proximal rib 45 which is of a size adapted to the inner diameter of the mounting hole 5 and protruding in the offsetting direction of the elastic engagement members 50. The outer side surface in the protruding direction of the proximal rib 45 is formed as an inclined surface 45a that extends in a fixed width to be in conformity with a change in the thickness of the mating member 1, and then extends obliquely inwards toward the stem portion 40 (see FIG. 4). Further, on the forward end side of the stem portion 40 and at one side portion on the elastic member 50 side, there protrudes in the offsetting direction of the elastic engagement members 50 a forward end side rib 46 which gradually increases in width toward the forward end of the stem portion 40. Due to the forward end side rib 46 and the proximal rib 45, there is formed, between the ribs 45 and 46, a valley-shaped cutout 47. Therefore, when the stem portion 40 is pulled out of the mounting hole 5, the stem portion 40 can be easily deformed.

At one side portion of the forward end portion of the stem portion 40, there protrude the pair of elastic engagement members 50, 50 from a position deviated from the axis C of the stem portion 40 (see FIGS. 3 and 5). The elastic engagement members 50, 50 extend toward the base portion 20 so as to be spread in an anchor-fluke-like fashion. On the outer side surface of the forward end portion thereof, there is provided a stepped engagement portion 51 having a lower step portion 52 and an upper step portion 53. When the mating member 1 is thin, the upper step portion 53 is engaged with the mounting hole 5, and when the mating member 1 is thick, the lower step portion 52 is engaged with the mounting hole 5 (see FIG. 5). Thus, it is possible to change the engagement position according to the thickness of the mating member 1.

As shown in FIG. 2, at the portion of each elastic engagement member 50 where the engagement portion 51 is provided, there is formed a large-width portion 57 extending toward the stem portion 40 along the peripheral direction of the mounting hole 57. The step portions 52 and 53 are also formed on the outer peripheral surface of the large-width portion 57. As a result, the engagement with the back-side peripheral edge of the mounting hole 5 is effected in a large area, thereby enhancing the detachment prevention force. Further, as shown in FIG. 2B, as compared with the remaining portions of the elastic engagement members 50, the large-width portions 57 are thin-walled, and are arranged nearer to the outer periphery. As shown in FIG. 3, the large-width portions 57 are situated so as to overlap the step portion 40. When the elastic engagement members 50 are deflected inwardly, the stem portion 40 gets behind the large-width portions 57, so it is possible to further deflect the elastic engagement members 57.

As shown in FIG. 3, in the clip 10 of the present invention, as seen in the axial direction of the stem portion 40, the axis C of the stem portion 40 and the line L connecting the centers of the engagement portions 51, 51 of the pair of elastic engagement portions 50, 50 are offset from each other. Referring also to FIG. 5, as stated above, in this embodiment, the axis C of the stem portion 40 is offset with respect to the center M1 of the mounting hole 5. Meanwhile, the line L connecting the centers of the engagement portions 51 is offset with respect to the center M1 of the mounting hole 5 on the side opposite to the center C of the stem portion 40.

Next, the procedures for arranging the harness H at a predetermined position of the mating member 1 such as a vehicle body panel by using the clip 10 constructed as described above, and the procedures for detaching the clip 10 from the mounting hole 5 will be described with reference to FIGS. 5 through 9.

First, the band portion 23 is wound around the outer periphery of the harness H, with its side where the engagement grooves 23a are provided being on the inner side, and the forward end portion thereof is inserted into the band insertion path 22, and drawn out on the opposite side. As a result, an engagement claw 25a of the lock claw 25 is engaged with an engagement groove 23a of the band portion 23 to thereby fasten the harness H for fixation (see FIG. 5).

When, in this state, the locking leg 30 is inserted into the mounting hole 5 of the mating member 1 from the front side, the pair of elastic engagement members 50, 50 are pressed against the inner periphery of the mounting hole 5 to be deflected inwardly. According to the thickness of the mating member 1, the lower step portion 52 or the upper step portion 53 of each engagement portion 51 engages with the back-side peripheral edge of the mounting hole 5. As shown in FIG. 5, in the case of this embodiment, the lower step portion 52 is engaged. Further, the flange portion 28 is elastically held in contact with the front-side peripheral edge of the mounting hole 5, and the mating member 1 is held between the flange portion 28 and the locking leg portion 30. In this way, the locking leg 30 is fixed to the mounting hole 5 so as to be free from detachment, making it possible to fix the harness H to the mating member 1 via the clip 10.

In this embodiment, there extends the large-width portion 57 in a predetermined width from one side portion of each engagement portion 51 along the peripheral direction of the mounting hole 5, so the area of engagement with the mounting hole 5 can be enlarged, and the clip 10 is firmly fixed to the mounting hole 5, making it possible to increase the detachment prevention force.

Further, at one side portion on the proximal side of the stem portion 40 and on the elastic engagement member 50 side, there protrudes the proximal side rib 45 in a size adapted to the inner diameter of the mounting hole 5, and the proximal side rib 45 abuts the inner periphery of the mounting hole 5. Therefore, the movement of the stem portion 40 within the mounting hole 5 is restricted, making it possible to prevent the clip 10 from rattling.

Next, when, for various reasons such as component repair, recycling involved in disposal, and, further, replacement of the harness H, there arises a need to detach the harness H and the clip 10 from the mating member 1, the harness H is grasped, and is pulled away from the mating member 1, that is, upwards in FIG. 5, with a force equal to or larger than a predetermined load.

As a result, the base portion 20 is pulled via the band portion 23, so that a pull-out force is exerted on the stem portion 40 with respect to the mounting hole 5. On the other hand, since the engagement portions 51 of the pair of elastic engagement members 50 engage with the back-side peripheral edge of the mounting hole 5, there is exerted a detachment prevention force with respect to the mounting hole 5. However, as stated above, the axis C of the stem portion 40 and the line L connecting the centers of the engagement portions 51 are offset from each other as seen in the axial direction of the stem portion 40, so the pull-out force and the detachment prevention force are exerted while offset from each other.

As a result, when the stem portion 40 is pulled in the state shown in FIG. 5, the pair of elastic engagement members 50, 50 are moved so as to be brought close to each other along the peripheral edge of the mounting hole 5 as shown in FIG. 6C, and the stem portion 40 moves in a direction opposite thereto as shown in FIGS. 6A and 6B. Since the first tapered surface 43 is formed on the proximal side of the stem portion 40, the stem portion 40 can be easily detached while in slide contact with the inner periphery of the mounting hole 5.

When, in the state shown in FIGS. 6A through 6C, the stem portion 40 is further pulled, the pair of elastic engagement members 50, 50 are moved so as to be brought closer to each other as shown in FIG. 7C, and the cutout portion 47 of the stem portion 40 reaches the inner periphery of the mounting hole 5 as shown in FIGS. 7A and 7B, and the stem portion 40 is bent at the cutout portion 47, and is deformed so as to be warped in an arch, and starts to gradually leave the mounting hole 5 as shown in FIG. 7A. As a result, the pair of elastic engagement members 50 are obliquely inclined, and the lower step portions 52 of the engagement portions 51 thereof obliquely abut the peripheral edge of the mounting hole 5, and a detachment prevention force is concentrated on the corner portions of the lower step portions 52.

When, in the above state, the stem portion 40 is further pulled, the pair of elastic engagement members 50, 50 move along the peripheral edge of the mounting hole 5 so as to be brought still closer to each other, and are inwardly contracted as shown in FIG. 8C. At the same time, the stem portion 40 is deformed so as to be greatly warped in an arch and pulled out of the mounting hole 5 as shown in FIGS. 8A and 8B. As a result, the pair of elastic engagement members 50 are obliquely inclined still more greatly, and the stress concentration on the corner portions of the lower step portions 52 of the engagement portions 51 thereof due to the detachment prevention force increases, and the corner portions of the lower step portions 52 of the elastic engagement members 50 are deformed in the length direction as well as the thickness direction, and no more detachment prevention force is exerted.

When, as shown in FIG. 9, the stem portion 40 is further pulled, the stem portion 40 is pulled out of the mounting hole 5, and at the same time the elastic engagement members 50 are also pulled out, making it possible to detach the clip 10 from the mounting hole 5. In the clip 10, the second tapered surface 44 is provided on the forward end portion of the stem portion 40 on the side opposite to the elastic engagement members 50, so the stem portion 40 can be easily pulled out of the mounting hole 5.

In this way, in the clip 10, the axis C of the stem portion 40 and the line L connecting the centers of the engagement portions 51, 51 of the pair of elastic engagement members 50, 50 are offset from each other as seen in the axial direction of the stem portion 40, whereby the clip 10 can be detached from the mounting hole 5 relatively easily solely by pulling the stem portion 40 via the base portion 20.

Further, in whichever direction the stem portion 40 may be pulled via the base portion 20, the axis C of the stem portion 40 and the line L connecting the centers of the engagement portions 51, 51 of the pair of elastic engagement members 50, 50 are offset from each other, whereby the stem portion 40 and the elastic engagement members 50 are deformed and pulled out while opening in an V-shape. Therefore, not depending upon the pulling direction, the detachment operation is facilitated. Further, due to the relative simple structure formed of the stem portion 40 and the elastic engagement members 50, it is possible to achieve a reduction in production cost.

Further, as shown in FIG. 2B, in this embodiment, the large-width portions 57 of the elastic engagement members 50 are thinner and are arranged nearer to the outer periphery than the other portions. Therefore, when the elastic engagement members 50, 50 are deflected, the stem portion 40 gets behind the large-width portions 57, making it possible to further contract the elastic engagement members 50, 50. Thus, if the length of the locking leg 30 is small, it is possible for the deflection margin for the elastic engagement members 50 to be large. Thus, there is no need to elongate the locking leg in order to obtain the requisite deflection margin, thereby making the locking leg 30 compact. Further, the large-width portions 57 are portions that obliquely abut the peripheral edge of the mounting hole 5 as a result of inclination of the engagement portions 51 of the pair of elastic engagement members 50 when detaching the clip 10. They easily undergo deformation due to stress concentration, thus facilitating the extraction of the clip 10.

FIGS. 12A through 12C show a clip according to the second embodiment of the present invention. The portions which are substantially the same as those of the above embodiment are indicated by the same reference numerals, and a description thereof will be omitted.

The clip 10a of this embodiment differs from the clip 10 of the above embodiment in the positional relationship between the stem portion 40 and the pair of elastic engagement members 50, 50. That is, in the clip 10a of this embodiment, in the state in which the clip 10a is fixed to the mounting hole 5, the axis C of the stem portion 40 is identical with the center M1 of the mounting hole 5, and the line L connecting the centers of the engagement portions 51, 51 of the pair of elastic engagement members 50, 50 is offset in one direction with respect to the axis C of the stem portion 40 (see FIG. 12C). Further, this embodiment also differs from the above embodiment in that the proximal ribs 45, 45 protrude from both sides of the proximal portion of the stem portion 40.

Also in the clip 10*a* of this embodiment, the axis C of the stem portion 40 and the line L connecting the centers of the engagement portions 51, 51 of the elastic engagement members 50, 50 are offset from each other. Therefore, by pulling the stem portion 40 via the base portion 20, the stem portion 40 and the elastic engagement members 50 are deformed and pulled out while opening in a V-shape, making it possible to easily detach the clip 10*a* from the mounting hole 5. Further, in the state in which the clip 10*a* is fixed to the mounting hole 5, the axis C of the stem portion 40 is identical with the center M1 of the mounting hole 5. This suppresses inclination of the stem portion 40 with respect to the mounting hole 5, making it possible to fix the clip 10*a* to the mounting hole 5 in a stable attitude.

FIGS. 13A through 13C show a clip according to the third embodiment of the present invention. The portions that are substantially the same as those of the above embodiment are indicated by the same reference numerals, and a description thereof will be omitted.

The clip 10*b* of this embodiment differs from the above-mentioned clips 10 and 10*a* in the positional relationship between the stem portion 40 and the pair of elastic engagement members 50, 50. That is, in the clip 10*b* of this embodiment, in the state in which the clip 10*b* is fixed to the mounting hole 5, the axis C of the stem portion 40 is offset with respect to the center M1 of the mounting hole 5, and the line L connecting the engagement portions 51, 51 of the pair of elastic engagement members 50, 50 is identical with the center M1 of the mounting hole 5, and is offset in one direction with respect to the axis C of the stem portion 40 (see FIG. 13C).

In the clip 10*b* of this embodiment also, the axis C of the stem portion 40 and the line L connecting the centers of the engagement portions 51, 51 of the elastic engagement members 50, 50 are offset from each other. Therefore, when the stem portion 40 is pulled via the base portion 20, the stem portion 40 and the elastic engagement members 50 are deformed and pulled out while opening in a V-shape, making it possible to easily detach the clip 10*b* from the mounting hole 5. Further, in the state in which the clip 10*b* is fixed to the mounting hole 5, the engagement portions 51 of the pair of elastic engagement members 50, 50 are engaged in a well-balanced manner with the opposing peripheral edge of the mounting hole 5, making it possible to firmly fix the clip 10*b* to the mounting hole 5.

FIGS. 14 through 26 show a clip according to the fourth embodiment of the present invention. The portions that are substantially the same as those of the above embodiments are indicated by the same reference numerals, and a description thereof will be omitted.

As shown in FIG. 14, while the clips of the first through third embodiment are fixed to the mounting hole 5, which is formed as a round hole, the clip 10*c* of this embodiment is fixed to a mounting hole 5*a* that is formed as an elongated hole. The clip 10*c* of this embodiment has a large-width locking leg 30 so as to be adapted to the mounting hole 5*a* in a form of the elongated hole.

The embodiment will be described specifically with reference to FIGS. 14 through 19. A shaft portion 27 formed in an oval configuration elongated in one direction extends from the lower surface of the lock portion 21 of the base portion 20 for fastening the harness H for fixation. Further, a flange portion 28 that is oval in plan view is connected to the outer periphery of the shaft portion 27. From the lower surface of the shaft portion 27, there protrudes by a predetermined length a stem portion 40*a* which is formed of a single pillar-like member as a whole and which is of a larger width than those of the above embodiments; a pair of elastic engagement members 50, 50 extend in an anchor-fluke-like fashion from the forward end portion of the stem portion 40*a*, forming a large-width locking leg 30. Further, at the forward end of each elastic engagement members 50, there is provided an engagement portion 51 having three step portions 52, 53, and 54 (see FIG. 15), making it possible to change the position for engagement according to the thickness of the mating member 1.

The large-width stem portion 40*a*, which is formed of a single pillar-like member as a whole, is forked at a mid way by a through-hole 61 formed in the intermediate portion thereof, forming two pillar-like portions 60, 60. The through-hole 61 extends through the stem portion 40*a* in a direction perpendicular to the line L (see FIG. 18) connecting the centers of the engagement portions 51, 51 of the pair of elastic engagement members 50, 50.

The two pillar-like portions 60, 60 form ribs protruding in a direction perpendicular to the line L connecting the centers of the engagement portions 51, 51 of the elastic engagement members 50, 50; their forward end portions are connected by a connecting portion 69, and their proximal portions are connected by a relatively thin connecting rib 63. The surface of the connecting rib 63 forms a recess 62 by the right and left pillar-like portions 60, 60 (see FIG. 16B). The distance between the pillar-like portions 60, 60 are gradually reduced toward the proximal side to constitute an interval V-shape.

At the proximal portion of the stem portion 40*a*, there are provided a pair of restriction ribs 65, 65 protruding on both sides from the proximal portions of the pillar-like portions 60, 60. The outer end edges of the restriction ribs 65, 65 are formed as inclined surfaces 65*a* extending gradually further outwards toward the proximal portion of the stem portion 40*a*. As shown in FIG. 16B, due to the inclined surfaces 65*a*, there is formed a predetermined gap between the outer side surfaces of the restriction ribs 65 and the inner side surfaces of the elastic engagement members 50, thereby enhancing the mold ability of the stem portion 40*a* and the pair of elastic engagement members 50.

Further, the restriction ribs 65 have peripheral surfaces 65*b* (see FIG. 18) on the proximal side thereof and on the side opposite to the elastic engagement members 50, the peripheral surfaces 65*b* being curved in an arcuate configuration in conformity with the inner peripheral configuration of the mounting hole 5*a* and serving to suppress rattling when the clip 10*c* is fixed to the mounting hole 5*a*.

Further, the surfaces of the restriction ribs 65 on the side opposite to the peripheral surfaces 65*b* are formed as relatively flat surfaces, do not hinder the inward deflection of the elastic engagement members 50, and are situated so as to be opposed to the elastic engagement members 50, forming restriction walls 65*c* preventing the elastic engagement members 50 from falling to the stem portion 40*a* side. As shown in FIG. 16A, the restriction walls 65*c* are somewhat inclined such that the farther away from the base portion 20 they are, the farther away they are from the elastic engagement members 50.

Referring to FIGS. 15 and 17, on the elastic engagement member 50 side of the proximal portion of the stem portion 40*a*, there is provided a protrusion 66 which is situated between the pair of elastic engagement members 50, 50 and which is formed by protruding members 67, 67 formed by the proximal portions of the pillar-like portions 60, 60 protruding on the elastic engagement member 50 side. Like the pillar-like portions 60, 60, the distance between the protruding members 67, 67 is gradually reduced toward the proximal side; as indicated by the phantom lines in FIG. 17, they do not interfere with the inward deflection of the elastic engagement members 50, 50, allowing them to be deflected to a sufficient degree. Further, the protruding members 67, 67 of the protrusion 66 are formed in a height adapted to the inner periphery of the mounting hole 5a when the locking leg 30 is inserted into the mounting hole 5a.

Further, referring also to FIG. 16A, the protruding members 67 are formed in a predetermined length from the proximal portions of the pillar-like portions 60, 60, and their end surfaces in the protruding direction are formed as gently inclined surfaces 67a whose height are gradually reduced toward the forward end portion of the stem portion 40a. Due to the inclined surfaces 67a, when pulling the stem portion 40a out of the mounting hole 5a, it can be easily pulled out without being caught by the inner periphery of the mounting hole 5a.

Further, at the forward end side of the stem portion 40a of each protruding member 67, there is formed a cutout portion 47 through a steep inclined surface 67b inclining to the stem portion 40a. The forward end side of the stem portion 40a of the cutout portion 47 is connected to a connecting portion 69 via a forward end side rib 46. The back side of the forward end side rib 46 is integrated with the forward end portion of the pillar-like portion 60.

As shown in FIGS. 18 and 19, the axis C of the stem portion 40a of this embodiment is a center of gravity of the cross section of a minimum diameter portion of the stem portion 40a taken in a direction perpendicular to the axial direction, that is, the cross section taken along the arrow line F-F' of FIG. 19. In this case, the cross section taken along the arrow line F-F' is a cross section divided into two sections by the two pillar-like portions 60, 60; the center of gravity of this case means a position enabling balancing the weights when making assumption that the weights corresponding to their sectional areas are applied to the respective centers of gravity of the two sections obtained.

The axis C is a position offset on the opposite side of the elastic engagement members 50 with respect to the axis M2 of the shaft portion 27 (which coincides with the center of the mounting hole 5a). Thus, as seen in the axial direction, the axis C of the stem portion 40a and the line L connecting the centers of the engagement portions 51, 51 of the elastic engagement members 50 are offset from each other.

While in this embodiment the interval between the protrusion 66 and the forward end side rib 46 is formed as the void due to the cutout portion 47, it is also possible, as indicated by the phantom line of FIG. 15, to connect this portion by a thin-film-like member 68 thinner than the protruding members 67 and the forward end side rib 46. When the thin-film-like portion 68 is provided, it is possible to enhance the rigidity of the stem portion 40a and to enhance the pull-out load of the clip 10c. By pulling the clip 10c with a force in excess of the pull-out load, the thin-film-like member 68 is broken, and the stem portion 40a starts to be deformed, thereby possible to detach the clip 10c from the mounting hole 5a. The thin-film-like member 68 may also be provided in the cutout portion 47 of the first clip 10 of the first embodiment shown in FIGS. 1 through 11, and of the clip 10b of the third embodiment shown in FIG. 13 (in either case, it is formed between the proximal side rib 45 and the forward end side rib 46); it may also be provided in the cutout portion 47 of a clip 10d according to the fifth embodiment described below. In the present invention, the minimum diameter portion of the stem portion means a portion of the stem portion whose cross-sectional area is minimum; also in the case in which the thin-film-like member is provided in the cutout portion as described above, the minimum diameter portion is a portion where the cross-sectional area is minimum.

As in the above embodiments, when attaching the harness H to the mating member 1 by using the clip 10c described above, the harness H is fastened and fixed by the band portion 23, and then the locking leg 30 is inserted into the mounting hole 5a, with the pair of elastic engagement members 50, 50, formed in a large width, being oriented in the longitudinal direction of the mounting hole 5a formed as an elongated hole. As a result, as shown in FIG. 20, depending on the thickness of the mating member 1, one of the step portions 52, 53, and 54 (step portion 54 in the example shown in FIG. 20) of each engagement portion 51 is engaged with the back-side peripheral edges of both arcuate end portions of the mounting hole 5a formed as an elongated hole, and the flange portion 28 is elastically brought into contact with the front-side peripheral edge of the mounting hole 5a, making it possible to fix the harness H to the mating member 1 through the clip 10c. In the case of this embodiment, the large-width locking leg 30 is engaged with the mounting hole 5a formed as an elongated hole. Thus, it is possible to prevent the clip 10c from turning and to fix the harness H firmly in a predetermined orientation.

In this case, at the proximal portion of the stem portion 40a, the forked pillar-like portions 60 are connected to the clip 10c by the connecting rib 63, so the stem portion 40 is not easily twisted, and the pull-out load during use can be increased. Further, the protrusion 66 formed in the proximal portion of the stem portion 40 and the peripheral surfaces 65b (see FIG. 18) of the restriction ribs 65 are adapted to the inner periphery of the mounting hole 5a, so it is possible to fix the clip 10c to the mounting hole 5a without involving any play.

As in the above embodiments, when there arises a need to detach the harness H and the clip 10c from the mating member 1, the harness H is grasped, and is pulled away from the mating member 1 with a force in excess of the predetermined load. Then, as in the above embodiments, the stem portion 40a and the elastic engagement members 50 undergo deformation, and it is possible to pull the clip 10c out of the mounting hole 5a.

That is, as seen in the axial direction of the stem portion 40a, the axis C of the stem portion 40a and the line L connecting the centers of the engagement portions 51, 51 are offset from each other. Therefore, when the stem portion 40a is pulled via the base portion 20, the pull-out force applied to the stem portion 40a and the detachment prevention force due to the pair of elastic engagement members 50, 50 are exerted while offset from each other. And, as shown in FIG. 21, the elastic engagement members 50, 50 engaged with both end portions of the mounting hole 5a move along the peripheral edge of the mounting hole 5a so as to be brought close to each other.

When the stem portion 40a is thus pulled, the elastic engagement members 50, 50 move, as shown in FIG. 22B, from the mounted state shown in FIG. 22A, and open in a V-shape with respect to the stem portion 40a. Further, the pillar-like member 60 of the stem portion 40a deforms at the cutout portion 47 to be warped in an arch, and the elastic engagement members 50, 50 are inclined obliquely. The elastic engagement members 50, 50 are further inclined, whereby the engagement surfaces of the step portions 54 are also inclined with respect to the mounting surface of the mating member 1.

When the stem portion 40a is further pulled up, the elastic engagement members 50, 50 further open in a V-shape with respect to the stem portion 40a as shown in FIG. 22C, and the inclination of the engagement surfaces of the step portions 54 increases, resulting in that the corner portions of the step portions 54 are cut away by the inner periphery of the mounting hole 5a to lose the engagement force, making it possible to pull the locking leg 30 out of the mounting hole 5a.

The protrusion 66 is formed such that the distance between the both side surfaces thereof decreases toward the base portion 20, so it can be deflected to a sufficient degree, with the deflection amount of the pair of elastic members 50, 50 not being restricted.

In the clip 10c of this embodiment, a midway portion of the stem portion 40a is forked, with the through-hole 61 being formed in the stem portion 40a, so the rigidity is lower than that of the structure in which the stem portion is not forked, and deformation occurs more easily. Thus, in whichever direction the stem portion 40a may be pulled, the locking leg 30 can be easily pulled out of the mounting hole 5a. Referring to the drawings, FIGS. 23 through 26 show how the locking leg 30 is deformed when the harness H is pulled at various pulling angles with respect to the mating member 1.

FIG. 23 shows a case in which the clip 10c is pulled in a direction of one of the pair of elastic members 50, 50 with respect to the mating member 1, that is, obliquely upwards to the left as shown in the drawing. When the clip 10c is pulled in the above-mentioned direction, a deforming force is applied to the pair of forked pillar-like portions 60, 60, and the right-hand pillar-like portion 60 is greatly deformed so as to be bent to the left. As a result, a gap is formed between the right hand elastic engagement member 50 and the stem portion 40a, and the right-hand side of the flange portion 28 is raised from the mounting hole 5. Thus, the elastic member 50 become easily movable along the inner peripheral edge of the mounting hole 5a, making it possible to pull out the locking leg 30 through deformation as described above.

FIG. 24 shows a case in which the clip 10c is pulled in a direction opposite to that in the case shown in FIG. 23, that is, obliquely upwards to the right as seen in the drawing. Contrary to the case of FIG. 23, when the clip 10c is pulled in the above-mentioned direction, the left-hand side pillar-like portion 60 is deformed so as to be greatly bent to the right, with the stem portion 40 forming a gap therebetween and the left-hand side of the flange portion 28 being raised from the mounting hole 5. As a result, it becomes easier for the elastic engagement member 50 to move along the inner peripheral edge of the mounting hole 5, making it possible to pull out the locking leg through deformation as described above.

FIG. 25 shows a case in which the clip 10c is pulled in a shorter-diameter direction of the mounting hole 5a and offset to the elastic engagement member 50 side with respect to the mating member 1, that is, obliquely upwards to the right as seen in the drawing. When the stem portion 40a is pulled in the above-mentioned direction, the stem portion 40a is inclined in that direction, and the elastic engagement members 50 move along the inner peripheral edge of the mounting hole 5a, with the stem portion 40a being pressed by the inner peripheral edge of the mounting hole 5a to be gradually deformed so as to be warped in an arch. As a result, it is possible to pull out the locking leg 30 through deformation as described above.

FIGS. 26A and 26B show a case in which the clip 10c is pulled in a direction opposite to that in FIG. 24 with respect to the mating member 1, that is, obliquely upwards to the left as seen in the drawing. As shown in FIG. 26A, when the clip 10c is pulled in the above-mentioned direction, the proximal portion of the stem portion 40a abuts the inner peripheral edge of the mounting hole 5a, and is strongly pressed by the inner peripheral edge of the mounting hole 5a, with the result that the stem portion 40a is easily deformed so as to be warped in an arch as shown in FIG. 26B. At the same time, the pair of elastic engagement members 50, 50 move gradually toward the stem portion 40a to abut the restriction rib 65. By further pulling the stem portion 40a, the locking leg 30 as a whole can be easily pulled out of the mounting hole 5a.

Since the pair of elastic engagement members 50, 50 having moved to the stem portion 40a side abut the restriction rib 65 as described above, it is possible to prevent the elastic engagement members 50 from falling to a large degree to the stem portion 40a side or being deflected. The mode of deformation of the elastic engagement members 50 at the time of clip detachment is maintained constant, making it possible to stabilize the pull-out load applied.

FIGS. 27 through 29 show a clip according to the fifth embodiment of the present invention. The portions that are substantially the same as those of the above embodiments are indicated by the same reference numerals, and a description thereof will be omitted.

As in the case of the clip 10c of the fourth embodiment, the clip 10d of this embodiment is fixed the mounting hole 5a formed as an elongated hole, and is provided with a large-width locking leg 30. The clip 10d differs most distinctively from the clip of the above embodiments in that the pillar-like portions 60, 60 of the stem portion 40b are not connected at their forward ends but are divided into two pillar-like members 60a, 60a. Otherwise, this clip is basically of the same configuration as the clip 10c of the fourth embodiment.

To describe it more specifically with reference to FIGS. 27 and FIGS. 28A and 28B, two pillar-like members 60a, 60a forming the stem portion 40b extend at a predetermined interval from the lower surface of the oval shaft portion 27 so as to be parallel to each other, and the elastic engagement member 50, 50 extends from each of the forward ends of the pillar-like members 60a, 60a toward the base portion 20 so as to exhibit an anchor-fluke-like form as a whole. That is, between the pillar-like members 60a, 60a, there is provided neither the connecting rib 63 connecting their proximal portions nor the connecting portion 69 connecting their forward end portions as in the case of the clip 10c of the fourth embodiment. As the result, the pillar-like members 60a, 60a are deformed independently of each other.

As shown in FIGS. 28A and 28B, the axis C of the stem portion 40b of this embodiment is at a position constituting the center of gravity of the cross section of the minimum diameter portion of the stem portion 40b taken in a direction perpendicular to the axial direction, that is, the center of gravity of the section taken along the arrow line G-G' of FIG. 28B. In this case, the cross section taken along the arrow line G-G' is a cross section divided into two sections by the two pillar-like portions 60a, 60a; the center of gravity of this case means a position enabling balancing the weights when making assumption that the weights corresponding to their sectional areas are applied to the respective centers of gravity of the two sections obtained.

The axis C is at a position offset with respect to the axis M2 of the shaft portion 27 (which coincides with the center of mounting hole 5a) on the side opposite to the elastic engagement members 50. Thus, as seen in the axial direction, the axis C of the stem portion 40a and the line L connecting the centers of the engagement portions 51, 51 of the elastic engagement members 50 is offset from each other.

As shown in FIG. 29, when the base portion 20 is pulled, the forward end portions of the two pillar-like members 60a, 60a abut each other, and the stem portion 40b is deformed so as to be warped at the cutout portion 47, making it possible to pull the locking leg 30 of the clip 10d out of the mounting hole 5a. In this embodiment, the stem portion 40b is composed of two pillar-like members 60a, 60a, each of which is independently deformed. Therefore, at the time of detachment of the clip 10d, the stem portion 40b is easily deformed, making it possible to pull the locking leg 30d smoothly out of the mounting hole 5a.

EXAMPLES

A test was conducted on how much tensile load is needed to allow detachment of the clip, in which the clip mounted to the mounting hole of the mating member was pulled in various pulling directions.

As examples, there were used clips, as shown in FIGS. 1 through 9, in which the axis C of the stem portion 40 and the line L connecting the centers of the engagement portions 51 were offset from each other as seen in the axial direction of the stem portion 40. As comparative example, there were used clips in which the axis C of the stem portion 40 and the line L connecting the centers of the engagement portions 51 coincided with each other as seen in the axial direction of the stem portion 40.

The clips of the examples and the comparative examples were fixed to the mounting hole of the mating member. In the fixed state, the clips were pulled to be detached from the mounting hole at various pulling angles with respect to the mating member, measuring the tensile load allowing detachment of the clips with respect to the different pulling angles (angles as measured with respect to the direction perpendicular to the mating member, which corresponds to 0°). The measurement results are shown in FIG. 30. In the drawing, a line S1 represents the examples, and a line S2 represents the comparative examples.

As shown in FIG. 30, the case of the comparative examples confirmed that there was involved a great variation in the requisite tensile load for detaching the clip. That is, the nearer the pulling angle to the horizontal direction, the smaller was the requisite tensile load for detaching the clip, whereas the nearer to the direction perpendicular to the mating member was the pulling angle, the larger the requisite tensile load for detachment.

In contrast, the case of the clips of the examples of the present invention confirmed that, in whichever direction the clip may be pulled with respect to the mating member, the requisite tensile load for detachment was substantially fixed, and that the requisite tensile load for detachment was smaller than that in the case of the comparative examples. That is, as will be understood, in the present invention, there is no need at all to taken into consideration the direction in which the clip is pulled; in whichever direction the clip may be pulled, it can be reliably detached, thus helping to achieve an improvement in terms of workability in detachment.

What is claimed is:

1. A clip to be fixed to a mounting hole formed in a mating member, comprising:
    a base portion to engage with a front-side peripheral edge of the mounting hole; and
    a locking leg to be inserted into the mounting hole and to engage with a back-side peripheral edge of the mounting hole, the locking leg extending from the base portion,
    wherein the locking leg comprises:
        a stem portion comprising at least one pillar-shaped member extending from the base portion; and
        a pair of elastic engagement members, which extend in an anchor-fluke-shaped fashion from a forward end of the stem portion toward the base portion, and which are provided with engagement portions to engage with the back-side peripheral edge of the mounting hole at forward ends of the anchor-fluke-shaped portions, the pair of elastic engagement members being connected to each other only at said forward end of the stem portion;
    wherein a shaft portion is formed in the base portion on a side toward the locking leg,
    wherein the stem portion extends from the shaft portion such that an axis of the stem portion is offset from a center of the shaft portion, and
    wherein a line connecting the engagement portions of the pair of elastic engagement members is offset from the center of the shaft portion on an opposite side of the center of the shaft portion with respect to the axis of the stem portion.

2. A clip according to claim 1, wherein the shaft portion has one of a columnar shape and an oval shape in cross-section.

3. A clip according to claim 1, wherein the engagement portions of the elastic engagement members are provided with large-width portions spreading toward the stem portion along a periphery of the mounting hole.

4. A clip according to claim 3, wherein the large-width portions of the elastic engagement members are thinner than remaining portions of the elastic engagement members and are arranged toward an outer periphery of the elastic engagement members.

5. A clip according to claim 1, wherein the stem portion is provided with a tapered surface formed at one side portion thereof, which is on a proximal side of the stem portion and an opposite side of the stem portion with respect to the elastic engagement members, and the tapered surface gradually protrudes outwards toward the base portion.

6. A clip according to claim 1, wherein the stem portion is provided with a proximal side rib formed at one side portion thereof, which is on a proximal side of the stem portion and on a same side of the stem portion as the elastic engagement members, and the proximal side rib protrudes toward the elastic engagement members and has a size adapted to an inner diameter of the mounting hole.

7. A clip according to claim 6, wherein the stem portion is provided with a forward end side rib formed at one side portion thereof, which is on a forward end portion side of the stem portion and on a same side of the stem portion as the elastic engagement members, and the forward end side rib gradually increases in width toward the forward end portion of the stem portion and toward the elastic engagement members, such that a valley-shaped cutout portion is provided between the proximal side rib and the forward end side rib.

8. A clip according to claim 1, wherein the stem portion is provided with a tapered surface formed at one side portion thereof, which is on a forward end portion side of the stem portion and an opposite side of the stem portion with respect to the elastic engagement members, and the tapered surface tapers inward such that the stem portion gradually reduces in diameter toward the forward end of the stem portion.

9. A clip according to claim 1, wherein the stem portion is composed of two pillar-shaped members, and wherein the elastic engagement members extend from the forward ends of the pillar-shaped members so as to exhibit an anchor-fluke-shaped configuration as a whole.

10. A clip according to claim 9, wherein the stem portion is provided with a connecting rib formed at a proximal portion thereof to connect the two pillar-shaped members.

11. A clip according to claim 1, wherein the stem portion is formed of a single pillar-shaped member, the single pillar-shaped member having a through-hole extending in a direction perpendicular to the line connecting the engagement portions of the pair of elastic engagement members such that the stem portion is forked halfway.

12. A clip according to claim 11, wherein the stem portion is provided with a connecting rib formed at a proximal portion thereof to connect portions of the forked pillar-shaped member.

13. A clip according to claim 1, wherein the stem portion is provided with a restriction rib formed at a proximal portion thereof, such that the restriction rib is situated on the stem portion side with respect to the elastic engagement members when the pair of elastic engagement members are inwardly deflected, to thereby restrict movement of the elastic engagement members toward the stem portion.

14. A clip according to claim 13, wherein a surface of the restriction rib opposed to one of the elastic engagement members is inclined away from the elastic engagement member as the surface extends away from the base portion.

15. A clip according to claim 1, wherein the stem portion is provided with a protrusion formed at a proximal portion thereof, the protrusion being situated between the pair of elastic engagement members to protrude toward the elastic engagement members so as to be adapted to the inner periphery of the mounting hole, and
wherein a distance between both side surfaces of the protrusion is gradually reduced toward the base portion.

16. A clip according to claim 1, wherein, in a state in which the clip is fixed to the mounting hole of the mating member, it is possible to pull the stem portion and the elastic engagement members out of the mounting hole by pulling the base portion from the front side of the mounting hole with a force of not less than a predetermined value.

17. A clip to be fixed to a mounting hole formed in a mating member, comprising:
   a base portion to engage with a front-side peripheral edge of the mounting hole; and
   a locking leg to be inserted into the mounting hole and to engage with a back-side peripheral edge of the mounting hole, the locking leg extending from the base portion,
wherein the locking leg comprises:
   a stem portion formed of a single pillar-shaped member extending from the base portion; and
   a pair of elastic engagement members, which extend in an anchor-fluke-shaped fashion from a forward end of the stem portion toward the base portion, and which are provided with engagement portions to engage with the back-side peripheral edge of the mounting hole at forward ends of the anchor-fluke-shaped portions,
wherein an axis of the stem portion and a line connecting centers of the engagement portions of the pair of elastic engagement members are offset from each other as seen in an axial direction of the stem portion, and
wherein the single pillar-shaped member has a through-hole extending in a direction perpendicular to the line connecting the centers of the engagement portions of the pair of elastic engagement members such that the stem portion is forked halfway.

18. A clip according to claim 17, wherein the stem portion is provided with a connecting rib formed at a proximal portion thereof to connect portions of the forked pillar-shaped member.

* * * * *